(12) United States Patent
Chan et al.

(10) Patent No.: US 11,749,114 B1
(45) Date of Patent: Sep. 5, 2023

(54) OCCUPANT FACING VEHICLE DISPLAY

(71) Applicant: Waymo LLC, Mountain View, CA (US)

(72) Inventors: Min Li Chan, San Francisco, CA (US); Philip Nemec, San Jose, CA (US); Brian Douglas Cullinane, Palo Alto, CA (US); Julien Mercay, Redwood City, CA (US); Peter Crandall, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 38 days.

(21) Appl. No.: 17/336,350

(22) Filed: Jun. 2, 2021

Related U.S. Application Data

(63) Continuation of application No. 16/165,283, filed on Feb. 8, 2019, now Pat. No. 11,056,003, which is a continuation of application No. 15/089,736, filed on Apr. 4, 2016, now Pat. No. 10,140,870.

(60) Provisional application No. 62/234,814, filed on Sep. 30, 2015.

(51) Int. Cl.
| | |
|---|---|
| *G08G 1/015* | (2006.01) |
| *G08G 1/017* | (2006.01) |
| *G08G 1/0962* | (2006.01) |
| *G06V 20/58* | (2022.01) |
| *G08G 1/16* | (2006.01) |
| *B60K 35/00* | (2006.01) |
| *G01C 21/36* | (2006.01) |
| *G08G 1/04* | (2006.01) |

(52) U.S. Cl.
CPC ............ *G08G 1/166* (2013.01); *B60K 35/00* (2013.01); *G01C 21/36* (2013.01); *G01C 21/3697* (2013.01); *G06V 20/58* (2022.01); *G08G 1/015* (2013.01); *G08G 1/017* (2013.01); *G08G 1/04* (2013.01); *G08G 1/0962* (2013.01); *B60K 2370/152* (2019.05); *B60K 2370/16* (2019.05); *B60K 2370/166* (2019.05); *B60K 2370/175* (2019.05); *B60K 2370/179* (2019.05); *B60K 2370/193* (2019.05); *B60K 2370/48* (2019.05); *B60K 2370/52* (2019.05)

(58) Field of Classification Search
CPC ........ G08G 1/166; G08G 1/015; G08G 1/017; G08G 1/04; G08G 1/0962; B60K 35/00; B60K 2370/152; B60K 2370/16; B60K 2370/166; B60K 2370/175; B60K 2370/179; B60K 2370/193; B60K 2370/48; B60K 2370/52; G01C 21/36; G01C 21/3697; G06V 20/58
See application file for complete search history.

(56) References Cited

U.S. PATENT DOCUMENTS

| | | |
|---|---|---|
| 7,265,661 B2 | 9/2007 | Satou |
| 7,710,248 B2 | 5/2010 | Greene et al. |
| 7,845,677 B2 | 12/2010 | Franke |
| 8,139,109 B2 | 3/2012 | Schmiedel et al. |
| 8,164,543 B2 | 4/2012 | Seder et al. |

(Continued)

*Primary Examiner* — Peter D Nolan
*Assistant Examiner* — Ashley L Redhead, Jr.
(74) *Attorney, Agent, or Firm* — Botos Churchill IP Law

(57) ABSTRACT

Aspects of the present disclosure relate to a vehicle for maneuvering an occupant of the vehicle to a destination autonomously as well as providing information about the vehicle and the vehicle's environment for display to the occupant.

21 Claims, 19 Drawing Sheets
(5 of 19 Drawing Sheet(s) Filed in Color)

(56) References Cited

U.S. PATENT DOCUMENTS

| | | |
|---|---|---|
| 8,195,394 B1 | 6/2012 | Zhu |
| 8,260,482 B1 | 9/2012 | Szybalski et al. |
| 8,346,426 B1 | 1/2013 | Szybalski et al. |
| 8,427,395 B2 | 4/2013 | Seder et al. |
| 8,676,431 B1 * | 3/2014 | Mariet .................. B60T 7/22 |
| | | 701/28 |
| 8,912,978 B2 | 12/2014 | Szczerba et al. |
| 8,924,150 B2 | 12/2014 | Tsimhoni et al. |
| 8,947,219 B2 | 2/2015 | Popovic |
| 8,989,944 B1 | 3/2015 | Agarwal et al. |
| 9,073,484 B2 | 7/2015 | Aimura et al. |
| 9,092,987 B2 | 7/2015 | Bone et al. |
| 9,146,898 B2 | 9/2015 | Ihlenburg et al. |
| 9,248,834 B1 | 2/2016 | Ferguson et al. |
| 9,588,340 B2 | 3/2017 | Ng-Thow-Hing et al. |
| 9,669,827 B1 | 6/2017 | Ferguson et al. |
| 9,914,452 B1 | 3/2018 | Ferguson et al. |
| 2004/0051659 A1 | 3/2004 | Garrison |
| 2005/0024492 A1 | 2/2005 | Schaefer et al. |
| 2006/0020662 A1 | 1/2006 | Robinson |
| 2006/0151223 A1 | 7/2006 | Knoll |
| 2006/0213714 A1 | 9/2006 | Igawa |
| 2008/0309468 A1 | 12/2008 | Greene et al. |
| 2009/0009603 A1 * | 1/2009 | Kim .................... G08G 1/166 |
| | | 348/148 |
| 2009/0138415 A1 | 5/2009 | Lancaster |
| 2010/0253493 A1 | 10/2010 | Szczerba et al. |
| 2010/0253542 A1 | 10/2010 | Seder et al. |
| 2012/0106869 A1 | 5/2012 | Machitani et al. |
| 2012/0314074 A1 | 12/2012 | Aimura et al. |
| 2013/0044218 A1 | 2/2013 | Matsuda et al. |
| 2013/0181823 A1 | 7/2013 | Staehlin et al. |
| 2013/0321401 A1 | 12/2013 | Piemonte et al. |
| 2013/0321628 A1 | 12/2013 | Eng et al. |
| 2014/0019005 A1 | 1/2014 | Lee et al. |
| 2014/0044310 A1 | 2/2014 | Schamp et al. |
| 2014/0132407 A1 | 5/2014 | Kumai et al. |
| 2014/0133700 A1 | 5/2014 | Seki |
| 2014/0136414 A1 | 5/2014 | Abhyanker |
| 2014/0139676 A1 | 5/2014 | Wierich |
| 2014/0226015 A1 | 8/2014 | Takatsudo et al. |
| 2014/0247352 A1 * | 9/2014 | Rathi .................. G06V 20/588 |
| | | 348/148 |
| 2014/0267398 A1 * | 9/2014 | Beckwith ............ G06T 19/006 |
| | | 345/633 |
| 2014/0270378 A1 | 9/2014 | Aimura et al. |
| 2014/0285667 A1 | 9/2014 | Aimura |
| 2014/0330479 A1 | 11/2014 | Dolgov et al. |
| 2015/0084755 A1 | 3/2015 | Chen et al. |
| 2015/0158430 A1 | 6/2015 | Dollinger et al. |
| 2015/0202770 A1 | 7/2015 | Patron |
| 2015/0210274 A1 | 7/2015 | Clarke et al. |
| 2015/0251599 A1 | 9/2015 | Koravadi |
| 2015/0296135 A1 | 10/2015 | Wacquant et al. |
| 2016/0003636 A1 | 1/2016 | Ng-Thow-Hing et al. |
| 2016/0005229 A1 | 1/2016 | Lee et al. |
| 2016/0019807 A1 | 1/2016 | Uchida et al. |
| 2016/0054452 A1 * | 2/2016 | Cosatto ................ G01S 17/931 |
| | | 701/412 |
| 2016/0221500 A1 | 8/2016 | Sakai et al. |
| 2016/0260326 A1 | 9/2016 | Ng-Thow-Hing et al. |
| 2016/0282468 A1 | 9/2016 | Gruver et al. |
| 2016/0321628 A1 | 11/2016 | Xu |
| 2016/0339959 A1 | 11/2016 | Lee |
| 2016/0362050 A1 | 12/2016 | Lee et al. |
| 2016/0365068 A1 | 12/2016 | Sakaguchi |
| 2017/0057514 A1 | 3/2017 | Toyoda et al. |
| 2017/0074652 A1 | 3/2017 | Send et al. |
| 2017/0277194 A1 | 9/2017 | Frazzoli et al. |
| 2018/0045519 A1 | 2/2018 | Ghadiok et al. |
| 2018/0172454 A1 | 6/2018 | Ghadiok et al. |
| 2018/0198955 A1 | 7/2018 | Watanabe |
| 2020/0269877 A1 * | 8/2020 | Mortazavi ............ G08G 1/0116 |

\* cited by examiner

1100

1320

1310

1300

OCCUPANT FACING VEHICLE DISPLAY

CROSS-REFERENCE TO RELATED APPLICATIONS

The present application is a continuation of U.S. patent application Ser. No. 16/165,283, filed Feb. 8, 2019, which is a continuation of U.S. patent application Ser. No. 15/089,736, filed on Apr. 4, 2016, now issued as U.S. Pat. No. 10,140,870, which claims the benefit of the filing date of U.S. Provisional Patent Application No. 62/234,814 filed Sep. 30, 2015, the entire disclosures of which are incorporated by reference herein. The present application is related to application Ser. Nos. 15/089,708, 15/089,716, and 15/089,776, filed Apr. 4, 2016, entitled Occupant Facing Vehicle Display, and the entire disclosures of which are incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

A key component of an autonomous vehicle is the perception system, which allows the vehicle to perceive and interpret its surroundings during a trip. When the autonomous system is engaged, the system will make various decisions during the trip, for example, speed up, slow down, stop, etc. The operator may be unaware of the calculations or "reasoning" behind why the autonomous vehicle is taking some particular action. In order to feel safe and confident, the operator may want to know what the vehicle is planning to do in the immediate future.

BRIEF SUMMARY

One aspect of the disclosure provides a method. The method includes receiving, by one or more processors, sensor data from one or more sensor systems configured to detect objects in an external environment of a vehicle; identifying, by the one or more processors, an object in the vehicle's environment using the sensor data; determining, by the one or more processors, that the vehicle must yield to the identified object in order to safely maneuver the vehicle to a destination; generating, by the one or more processors, a representation of the object for a scene display depicting the external environment of the vehicle, the representation of the object including a feature having a first color; generating, by the one or more processors, an intent indicator that indicates the determination that the vehicle must yield to the identified object for an intent display depicting the intent of the vehicle with respect to the external environment of the vehicle, the intent indicator including a feature having the first color; and providing, by the one or more processors, the representation of the object and intent indicator for display to an occupant of the vehicle in order to indicate to the occupant a relationship between the representation of the object and the intent indicator through the first color.

In one example, the representation of the object is provided for display in a first area of an electronic display corresponding to the scene display, the intent indicator is provided for display in a second area of an electronic display distinct from the scene display. In another example, the representation of the object is provided for display in a first area of an electronic display corresponding to the scene display and the intent indicator is provided for display as an overlay on the first area of the electronic display over the scene display. In another example, an area within the intent indicator which overlays a portion the scene display includes a blur effect for the portion in order to distinguish the intent indicator from the scene display. In another example, the method also includes generating a three-dimensional background scene using detailed map information corresponding to the external environment of the vehicle, and the background scene is provided as a background for the representation of the object and the intent indicator is provided as a two-dimensional image configured to be overlaid onto the three-dimensional background scene. In another example, the feature of the representation of the object is a first ring, and the feature of the intent indicator is a second ring. In another example, the feature of the representation of the object is a first ring drawn around a depiction of sensor data corresponding to the object and the feature of the intent indicator is a second ring drawn around a depiction of intent of one or more computing devices of the vehicle. In another example, the feature of the representation of the object is an abstract depiction of the object and the feature of the intent indicator is a ring drawn around a depiction of intent of one or more computing devices of the vehicle.

A further aspect of the disclosure provides a method. The method includes receiving, by one or more processors, sensor data from a sensor configured to detect objects in an external environment of a vehicle; identifying, by the one or more processors, a first object and a second object in the vehicle's environment from the sensor data; determining, by the one or more processors, that the first object is relevant to safely maneuvering the vehicle to a destination; determining, by the one or more processors, that the second object is not currently relevant to safely maneuvering the vehicle to the destination; generating, by the one or more processors, a representation of the first object for a scene display depicting the external environment of the vehicle, the representation of the first object including a feature having a first color scheme; generating, by the one or more processors, a representation of the second object for the scene display, the representation of the second object having a second color scheme, wherein the first color scheme is configured to stand out from the second color scheme; generating, by the one or more processors, a three-dimensional background scene in the second color scheme using detailed map information corresponding to the external environment of the vehicle; and providing, by the one or more processors, the representation of the first object, the representation of the second object, and the background scene for display to an occupant of the vehicle in order to indicate to the occupant that first object is relevant to safely maneuvering the vehicle to a destination and that the second object is not currently relevant to safely maneuvering the vehicle to the destination.

In one example, the background scene includes lane lines in the second color scheme, and the representation of the first object and the representation of the second object both represent vehicles. In another example, the background scene includes static objects detected the vehicle's external environment and included with the detailed map information. In another example, the sensor data indicates that both the first object and the second object are of a same type. In another example, the method also includes, after providing the first representation for display, determining that the first object should no longer be shown as relevant to safely maneuvering the vehicle to the destination; generating, based on the determination that the first object should no longer be shown as relevant, a new representation of the first object in the second color scheme; and providing the new representation as a replacement for the representation of the first object in order to indicate to the occupant that the first object is no longer relevant to safely maneuvering the vehicle to the destination. In another example, the new representation is provided such that the representation of the first object will appear to fade into the background scene by being replaced with the new representation. In another example, after providing the second representation for display, determining that the second object is relevant to safely maneuvering the vehicle to the destination; generating a new representation of the second object in the second color scheme; and providing the new representation as a replacement for the representation of the second object in order to indicate to the occupant that the first second is relevant to safely maneuvering the vehicle to the destination. In another example, the new representation is provided such that the new representation of the first object will appear to fade in from the background scene when replacing the representation of the first object. In another example, determining that the first object is relevant to safely maneuvering the vehicle to the destination is based on a determination that the vehicle must take a specific action in order to avoid the first object for a predetermined period of time into the future. In this example, determining that the second object is not currently relevant to safely maneuvering the vehicle to the destination is based on a determination that the vehicle need not take any specific action in order to avoid the second object for a predetermined period of time into the future. In another example, the method also includes determining a route to a destination; generating a path for display in the scene display representing the route; providing the route for display in a third color scheme different from the second color scheme in order to distinguish the path from the background scene; and after providing the route for display, when the vehicle has stopped to avoid an object, providing the route for display in the second color scheme in order to indicate to the occupant that the vehicle is temporarily stopped but will shortly resume the route.

Another aspect of the disclosure provides a method. The method includes receiving, by one or more processors, sensor data from a sensor configured to detect objects in an external environment of a vehicle; identifying, by the one or more processors, a first object of a first type and a second object of a second type in the vehicle's environment from the sensor data, the first type and the second type being different; generating, by the one or more processors, a representation of the first object for a scene display depicting the external environment of the vehicle based on the first type, wherein the representation of the first object includes a display of at least a portion of the sensor data corresponding to the object and indicates an intent of one or more of the vehicle's computers with regard to the first object; generating, by the one or more processors, a representation of the second object for the scene display based on the second type, wherein the representation of the second object is an abstract representation of an object and indicates an intent of the one or more of the vehicle's computers with regard to the second object; and providing, by the one or more processors, the representation of the first object and the representation of the second object for display on an electronic display to an occupant of the vehicle in order to indicate to the occupant that the first object and the second objects are of different types and that the first object is more vulnerable to an impact with the vehicle than the second object.

In one example, the representation of the first object includes a laser point cloud that provides the occupant with an indication of the particular shape of the first object. In this example, the representation of the second object is a stylized cuboid that does not provide the occupant with an indication of the particular shape of the first object. In another example, the first object is a pedestrian and the second object is a vehicle. In another example, the first type is bicyclist and the second type is vehicle. In another example, the method also includes generating a three-dimensional background scene using detailed map information corresponding to the external environment of the vehicle; and providing the three-dimensional background scene for display with the representation of the first object and the representation of the second object. In another example, the method also includes identifying a third object of a third type in the vehicle's environment from the sensor data; generating a representation of the third object that is a same representation as the representation of the second object; and providing the representation of the third object for display with the representation of the first object and the representation of the second object. In this example, the third type is a same type as the second type. In addition, the second object and the first object are vehicles. Alternatively, the third type is a different type from the second type. In addition, the second object is a car and the third object is a tractor trailer.

Yet another aspect of the disclosure provides a method. The method includes receiving, by one or more processors, sensor data from a sensor configured to detect objects in an external environment of a vehicle; generating, by the one or more processors, a background scene for display corresponding to an area of the external environment of the vehicle; identifying, by the one or more processors, a set of objects in the area from the sensor data, the objects of the set of objects corresponding to one or more of a vehicle, a pedestrian, and a bicyclist; filtering, by the one or more processors, the set of objects based on a set of heuristics; generating, by the one or more processors, a representation of each object of the filtered second set of objects; and providing, by the one or more processors, any generated representations and the background scene for display to an occupant of the vehicle on an internal electronic display of the vehicle, wherein the filtering reduces clutter on the internal electronic display.

In one example, the heuristics include a vulnerability of the object. In this example, the vulnerability of a pedestrian gives an object corresponding to a pedestrian a higher priority to be included in the filtered set of objects than an object corresponding to a vehicle. In addition or alternatively, the vulnerability of a bicyclist gives an object corresponding to a bicyclist a higher priority to be included in the filtered set of objects than an object corresponding to a vehicle. In addition or alternatively, the vulnerability of a pedestrian gives an object corresponding to a pedestrian a higher priority to be included in the filtered set of objects than an object corresponding to a bicyclist. In another example, the filtering is based on a category of action of each object of the set of objects. In another example, the filtering is based on whether an object of the set of objects is in a same lane as the vehicle. In another example, the filtering is based on whether an object of the set of objects is merging into a same lane as the vehicle. In another example, the filtering is based on whether an object of the set of objects is turning into in a same lane as the vehicle. In another example, the filtering is based on whether the vehicle needs to take an action to avoid an object of the set of objects.

The disclosure also provides for non-transitory, tangible computer readable medium on which instructions are stored, the instructions when executed by one or more processors cause the one or more processors to perform any of the methods discussed above and herein. In addition, the disclosure also provides for systems including one or more computing devices having one or more processors configured to perform any of the methods discussed above and herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
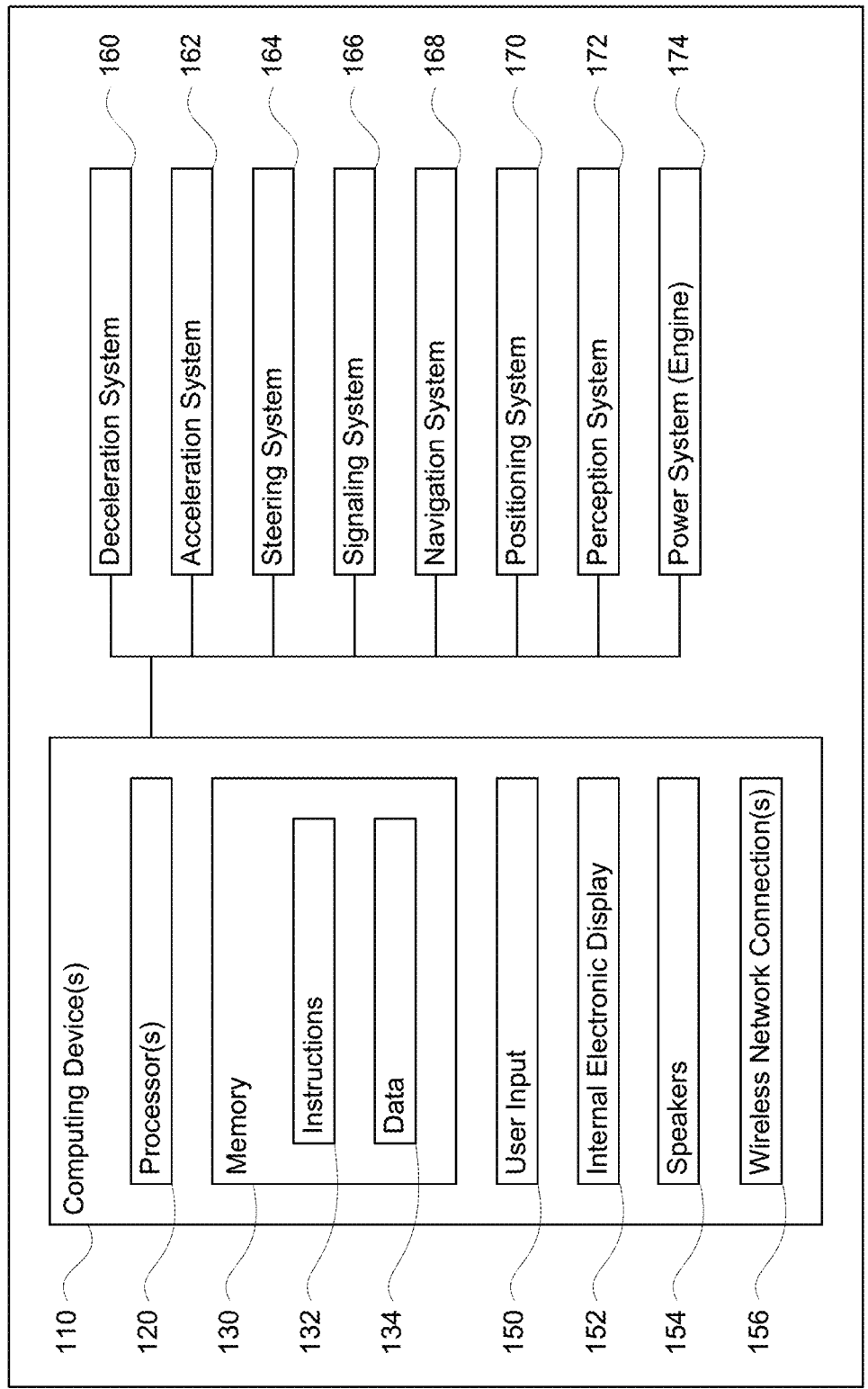
FIG. 1 is a functional diagram of an example vehicle in accordance with aspects of the disclosure.

The technology relates to a vehicle for maneuvering a passenger to a destination, for example taking a trip, autonomously. In order to provide a safe, enjoyable and relaxing experience for passengers, it is important to be able to relate to providing information to an occupant of a vehicle about the vehicle's surrounding environment as well as about how the vehicle's computers are reacting to those surroundings. As an example, one or more in-vehicle displays may provide information about objects in a vehicle's surroundings. How and which objects are depicted can be used in order to quickly and easily indicate information about the objects to an occupant of the vehicle. For instance, different types or categories of objects, such as pedestrians, vehicles, bicycles, static objects, moving objects, etc., can be displayed with different image treatments and colors to indicate different types of information to an occupant.

When the vehicle operates in a semiautonomous or fully autonomous mode, the vehicle's computers may not only detect these objects, but also respond or react to them. Thus, the in-vehicle display can display information about how the vehicle's computers plan to react to those objects, or rather, the vehicle's intent. In this regard, the in-vehicle display can include a scene display for displaying a one or more representative objects and a scene corresponding to an area around the vehicle and an intent display for displaying intent of the vehicle with respect to one or more of these objects.

The scene and intent displays can be arranged in various ways. For instance, the scene display and intent display may be displayed on the same or different electronic displays of the vehicle. The intent display may therefore actually include a sub-area of the scene display such as a side or corner area of the scene display such that the intent display appears to overlap or is overlaid or superimposed on the scene display. Similarly, the intent display and the scene display may be depicted as discrete areas of an electronic display such that there is no overlap or overlay.

In addition, the scene display and intent display may be distinguished based on how the features in these displays are depicted. As an example, the scene of the scene display may be a three-dimensional (3D) image having a depth while the features of the intent display may appear to be flat or two-dimensional (2D). Alternatively, both the scene and intent displays may appear to be in 2D or 3D.

The relationship between a representative object and the vehicle's intent relative to an object may be presented using colors. As an example, a pedestrian representation shown in the scene display may have a yellow ring or other indicator, while corresponding intent to yield (or simply an acknowledgement that an object has been identified as a pedestrian) may be displayed with a corresponding yellow ring in the intent display. Similarly, a representation of a vehicle shown in the scene display with a purple ring or indicator and a corresponding intent to yield to the vehicle may be displayed in the intent display with a corresponding purple ring or indicator. Also, different types of objects can be shown with the same color in the scene display when the same intent is shown in the intent display (i.e. yielding to a bicyclist and a vehicle).

In many examples, the vehicle's perception system will detect significantly more objects in the vehicle's external environment than are useful or helpful to display to a passenger. Objects that are identified must therefore be filtered. Filtering may be achieved, for example, using various heuristics related to the vulnerability of an object (pedestrians and bicyclists having higher priority than other objects unless those other objects are doing something else interesting), the category of action for the object (moving in the same lane, merging, turning into the lane, etc.), whether the vehicle needs to take an action to avoid the object (change lanes, slow down, turn the wheels, etc.), distance from the vehicle, speed of the object, etc. In addition, certain road features, such as construction zones or traffic signal lights, may be omitted from the scene display, but the intent for those features (cautious or slower than usual driving and/or stopping) may still be indicated in the intent display. By doing so, this will reduce the amount of "clutter" in the object display.

In some instances, representations of different types or categories of objects can be shown in the scene display using different image treatments in order to quickly and easily indicate information about the objects to a passenger in the vehicle. For example, static objects or background features, such as lane lines, crosswalks, or other road features, may be displayed in one color scheme (i.e. all blues or grays), while objects that more important, such as vehicles, pedestrians, or bicyclists may be shown in different colors in order to distinguish them from the background features. For instance, moving objects to which the vehicle is actually reacting (i.e. changing its behavior to slow down, yield, etc.) may be distinguished from the background features using different colors. At the same time, moving objects which do not affect the vehicle's behavior may also be shown in the background color scheme.

In this regard, as objects become more or less important, their prominence can be represented through changes in the color of the representations of those objects as shown in the scene display. As an example, another vehicle in front of the vehicle may change from a brighter color to a duller color when the other vehicle has turned onto a different roadway. Thus, the other vehicle will appear to "fade" into the background of the scene display. In another example, another vehicle which moves into the vehicle's lane in front of the vehicle may change from a color of the background scheme to a brighter color as it becomes more relevant to the vehicle. Similarly, the scene display may show a representation of a path of the vehicle which also fades to the background color scheme when the vehicle has come to a stop or is temporarily yielding to an object.

In addition, specific types of the moving objects may be represented in the scene display in different ways. As an example, more vulnerable types of objects may be shown using laser point clouds. Point clouds allow a passenger to potentially pick up on details of a pedestrian or bicyclist such as what direction they are facing or moving. Other less vulnerable objects, such as vehicles, may be represented using a more abstract representation such as a box, tray, or stylized cuboid. These more generic representations in combination with the point cloud representations given a passenger a good sense that the vehicle has identified different objects and can also distinguish between vulnerable and less vulnerable objects.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 134 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the detailed map information and navigation system 168. Computer 110 may use the positioning system 170 to determine the vehicle's location and perception system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computer 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

Figure 2:
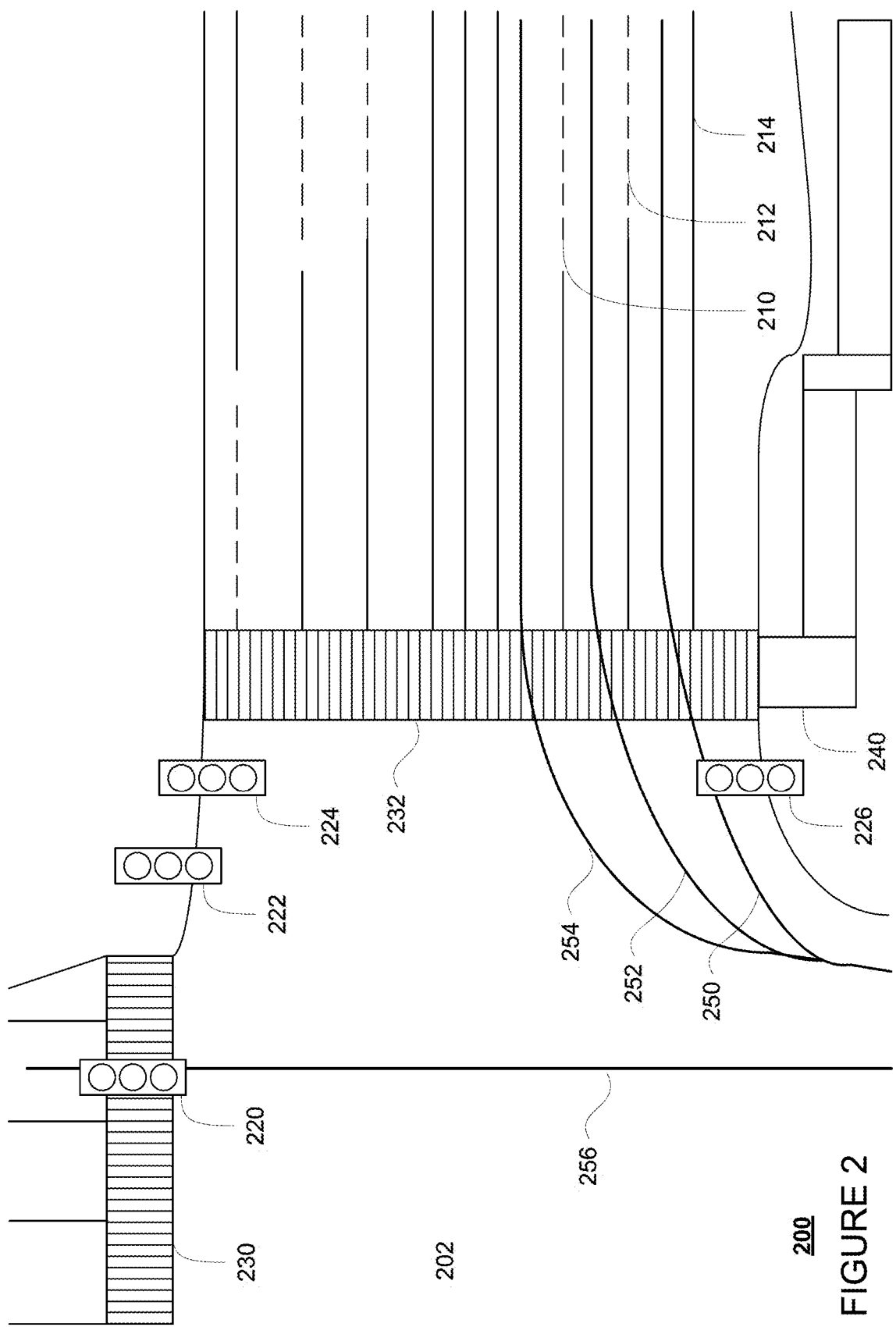
FIG. 2 is an example representation of detailed map information in accordance with aspects of the disclosure.
Figure 3A:
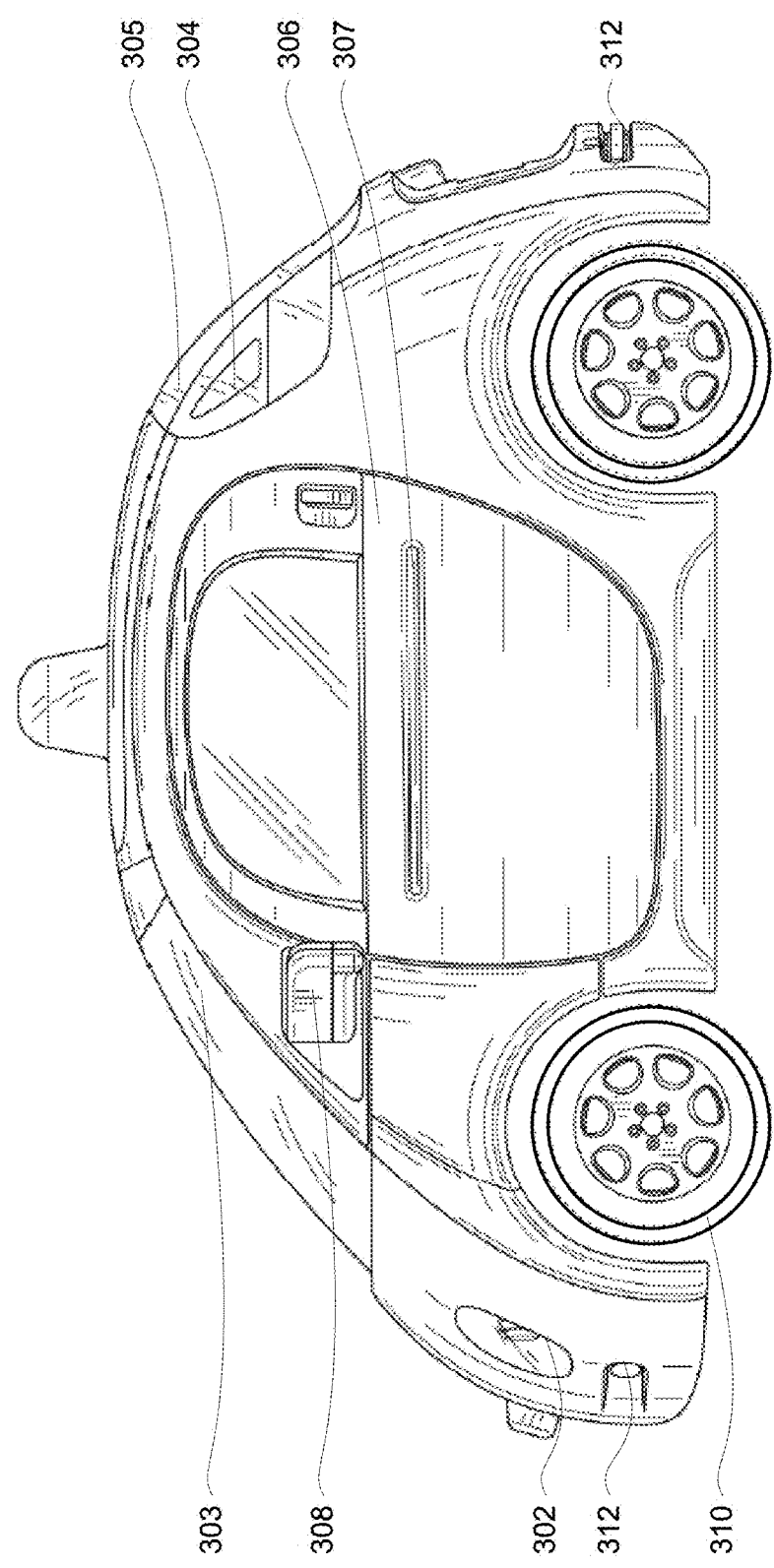
FIGS. 3A-3D are example external views of a vehicle in accordance with aspects of the disclosure.
Figure 3C:
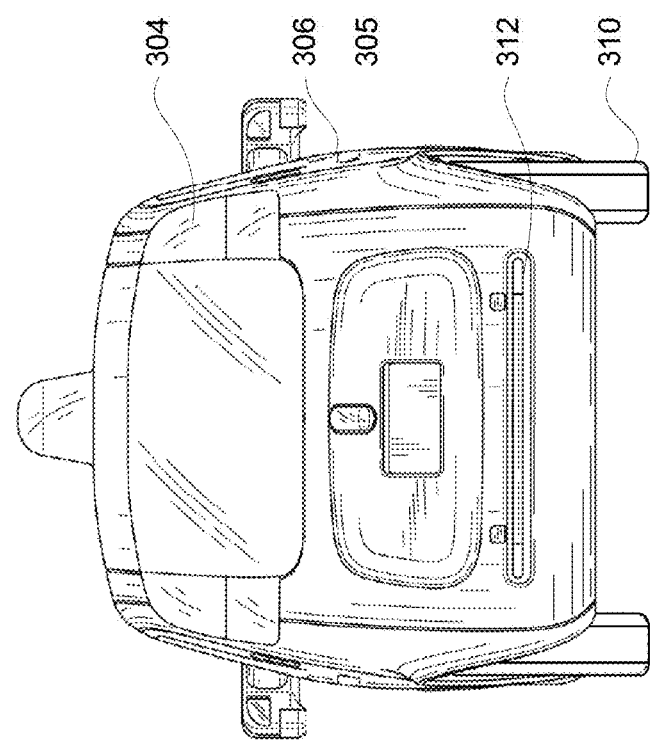
Figure 3B:
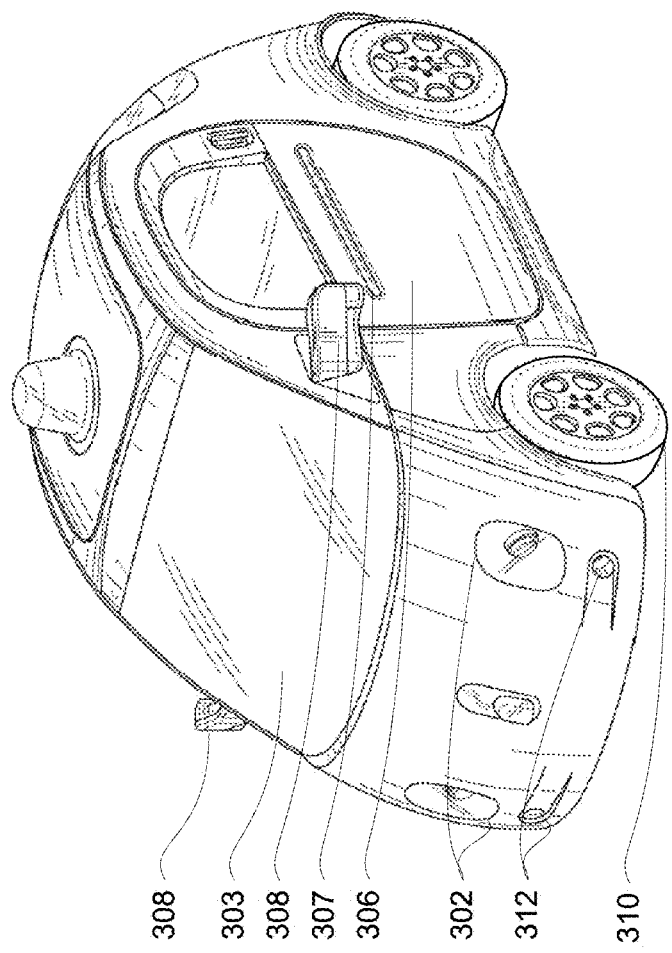
Figure 3D:
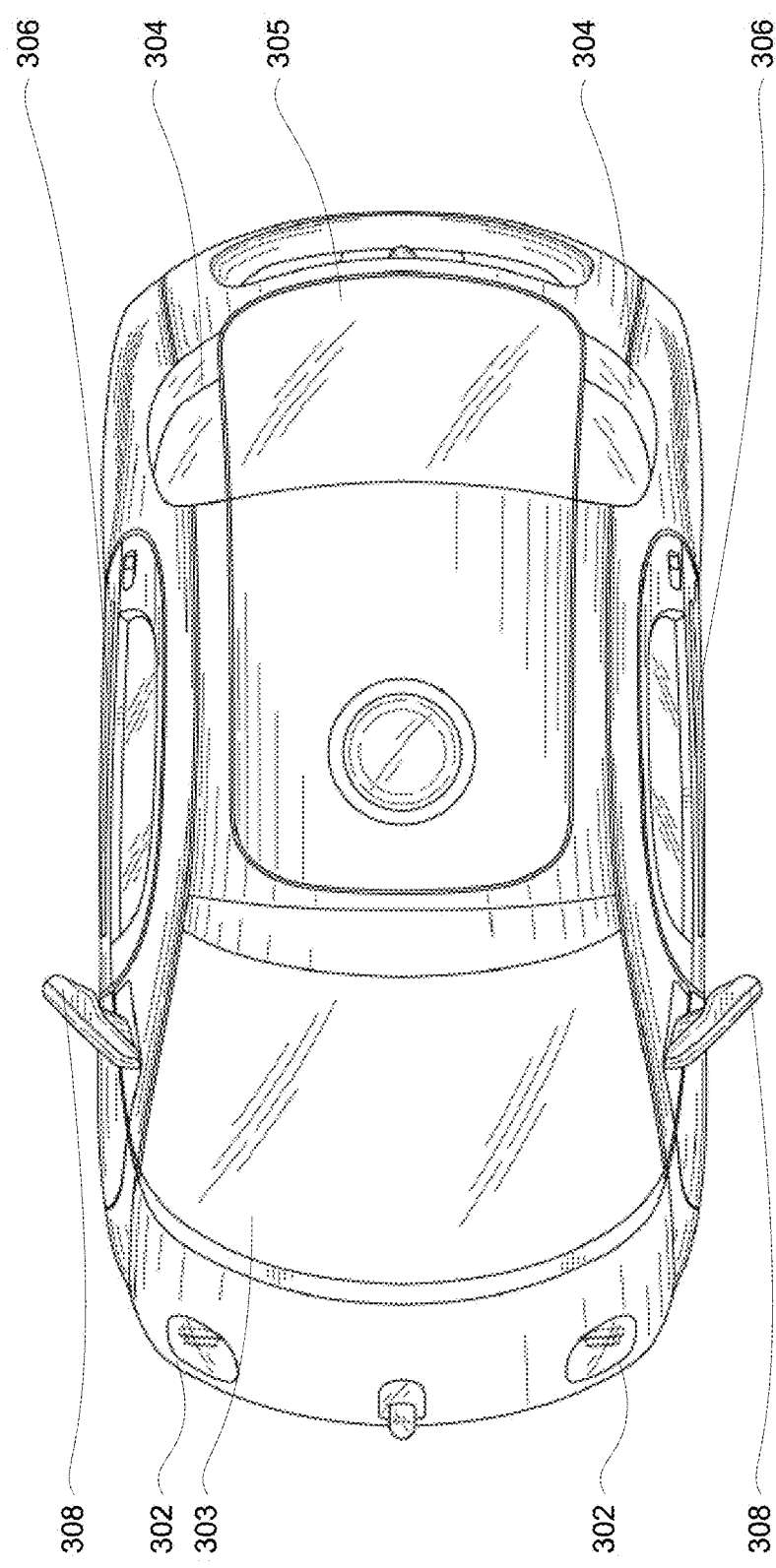

FIG. 2 is an example of detailed map information 200 for a section of roadway including an intersection 202. In this example, the detailed map information 200 includes information identifying the shape, location, and other characteristics of lane lines 210, 212, 214, traffic signal lights 220, 222, 224, 226, crosswalks 230, 232, and sidewalks 240. Each lane may be associated with a rail 250, 252, 254, 256 which indicates the direction in which a vehicle should generally travel in the respective lane. For example, a vehicle may follow rail 252 when driving in the lane between lane lines 210 and 212.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166.

Figure 4:
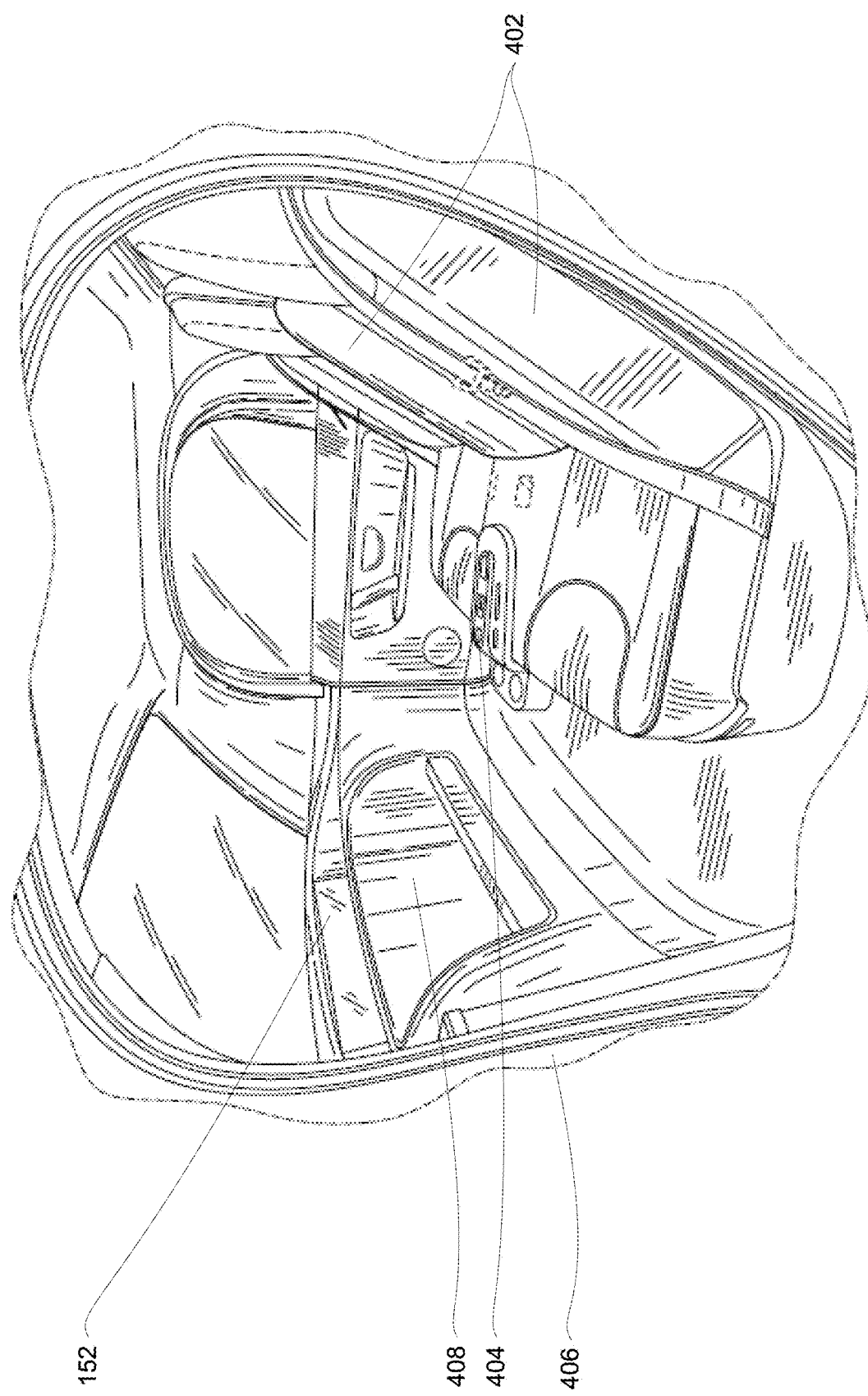
FIG. 4 is an example internal view of a vehicle in accordance with aspects of the disclosure.

FIG. 4 is an example internal view of vehicle 100 through the opening of door 306. In this example, there are two seats 402 for passengers with a console 404 between them. Directly in ahead of the seats 402 is a dashboard configuration 406 having a storage bin area 408 and the internal electronic display 152. As can be readily seen, vehicle 100 does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, as described in further detail below, user input is limited to a microphone of the user input 150 (not shown), features of the console 404, and, if available, wireless network connections. In this regard, internal electronic display 152 may merely provide information to the passenger and need not include a touch screen or other interface for user input. In other embodiments, the internal electronic display 152 may include a touch screen or other user input device for entering information by a passenger such as a destination, etc. Similarly, the vehicle may include a steering, acceleration and braking input that a passenger can use to control the vehicle in a manual or semi-autonomous driving mode.

Figure 5:
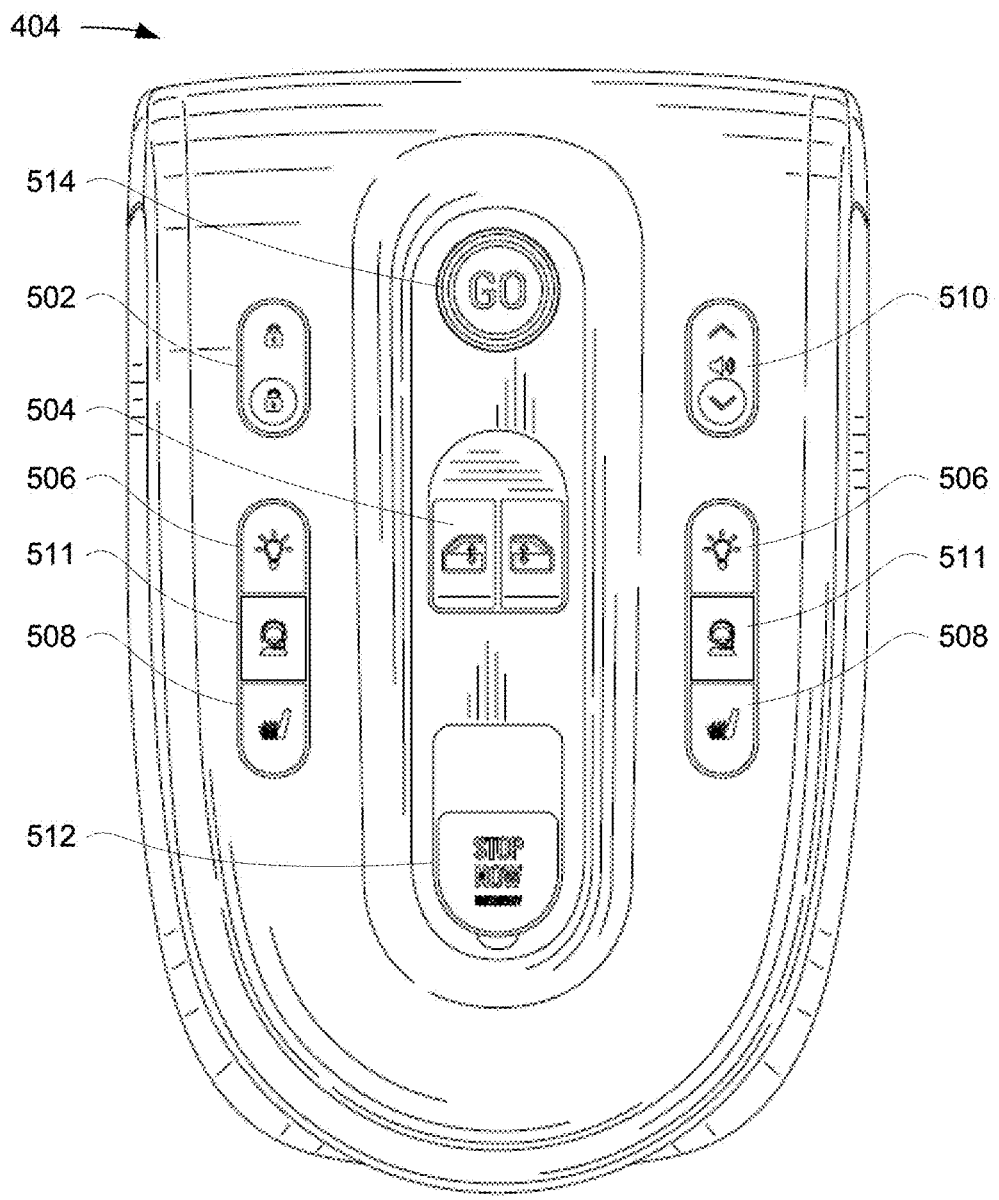
FIG. 5 is an example of a console of a vehicle in accordance with aspects of the disclosure.

FIG. 5 is a top down view of the console 404. Console 404 includes various buttons for controlling features of vehicle 100. For example, console 404 includes buttons that may be found in a typical vehicle such as buttons 502 for locking and unlocking the doors 306, buttons 504 for raising or lowering the windows of doors 306, buttons 506 for turning on internal lights of the vehicle, buttons 508 for controlling a heating function of seats 402, as well as buttons 510 for controlling the volume of speakers 154.

In addition, console 404 also includes buttons 511 for initiating communication with a remote concierge via a wireless network connection if available. Buttons 512 and 514 may also be a part of user input 150 and in this regard, allow a passenger to communicate with computer 110, for example, to initiate or end a trip in the vehicle. In this regard, button 512 may act as an emergency stopping button that, when pushed, causes vehicle 100 to stop in a short amount of time. Because the passenger does not have direct control of the acceleration or deceleration of vehicle 100 by way of a gas or brake pedal, button 512 may be an emergency stop button that is critical to allowing a passenger to feel safe and act quickly in case of an immediate emergency.

Button 514 may be a multi-function button. For example, button 514 may have three different states. In the first state, button 514 may be inactive, that is, if pressed, the vehicle's computer 110 would not respond by taking any particular action with regard to controlling the movement of the vehicle. In the second state, when the vehicle is ready to begin a trip, the button 514 may change to a "GO" button which a passenger uses to initiate a trip to a destination or drop off location. Once vehicle 100 is moving, button 514 may change to a third state, where the button 514 is a "PULL OVER" button which a passenger users to initiate a non-emergency stop. In this regard, computer 110 may respond by determining a reasonable place to pull the vehicle over, rather than coming to a more sudden stop as with the emergency stop button 512.

Thus, passenger communication with computer 110 for navigation purposes may be limited to button 514, emergency stopping button 512, a short range wireless communication system (such as Bluetooth LE) with the passenger's client computing device, and by sending information from the passenger's client computing device to a remote server which then relays that information to the vehicle's computer. In some examples, a passenger may provide information to the vehicle's computer 110 via voice commands though the microphone as discussed above. In addition, however, the passenger may communicate with the concierge via a phone call, an application on the passenger's client computing device, a microphone, and/or the concierge button 511 and in turn, the concierge may provide instructions control certain aspects of a vehicle via a concierge work station.

Figure 6:
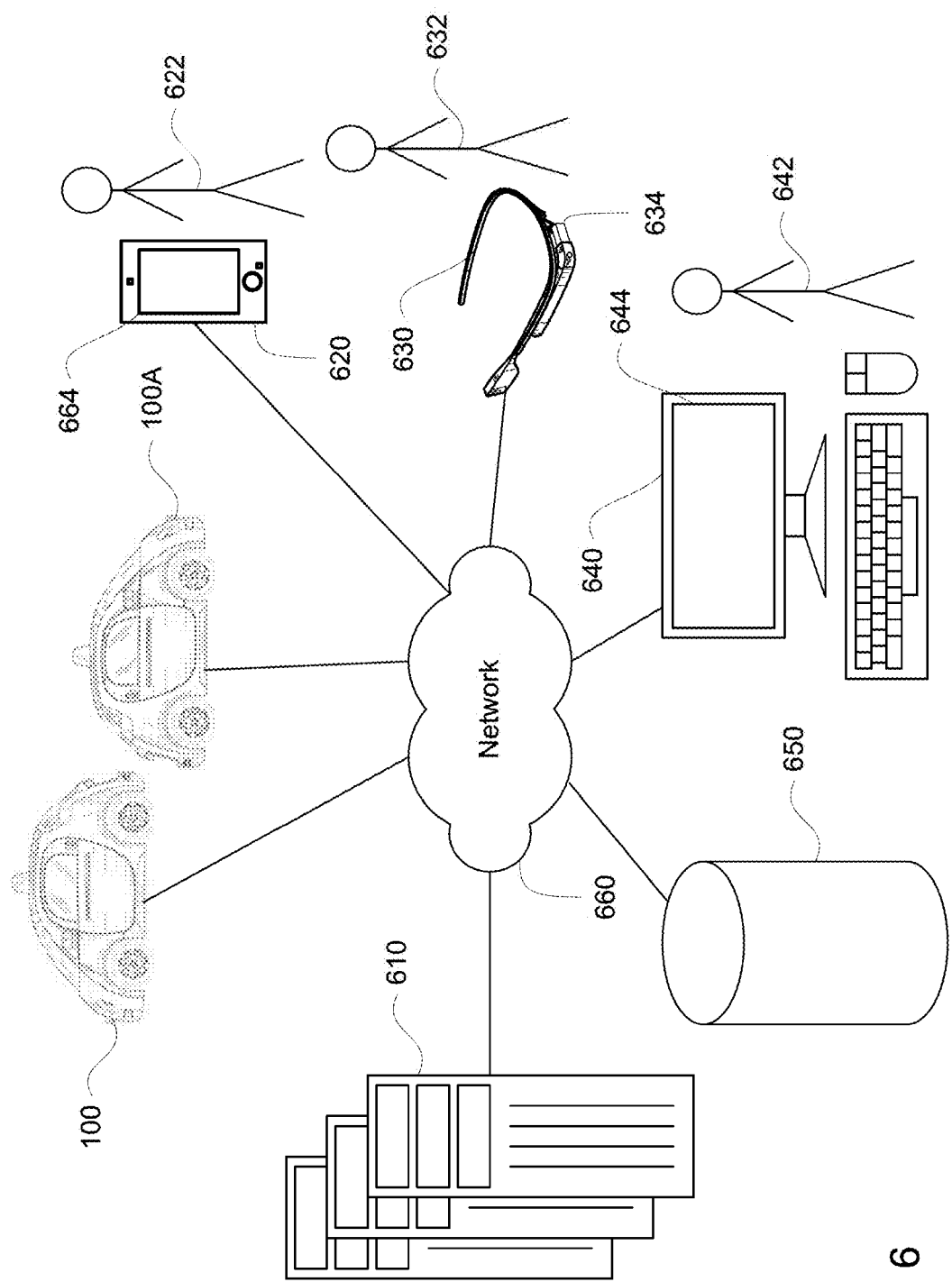
FIG. 6 is a functional diagram of an example system in accordance with aspects of the disclosure.
Figure 7:
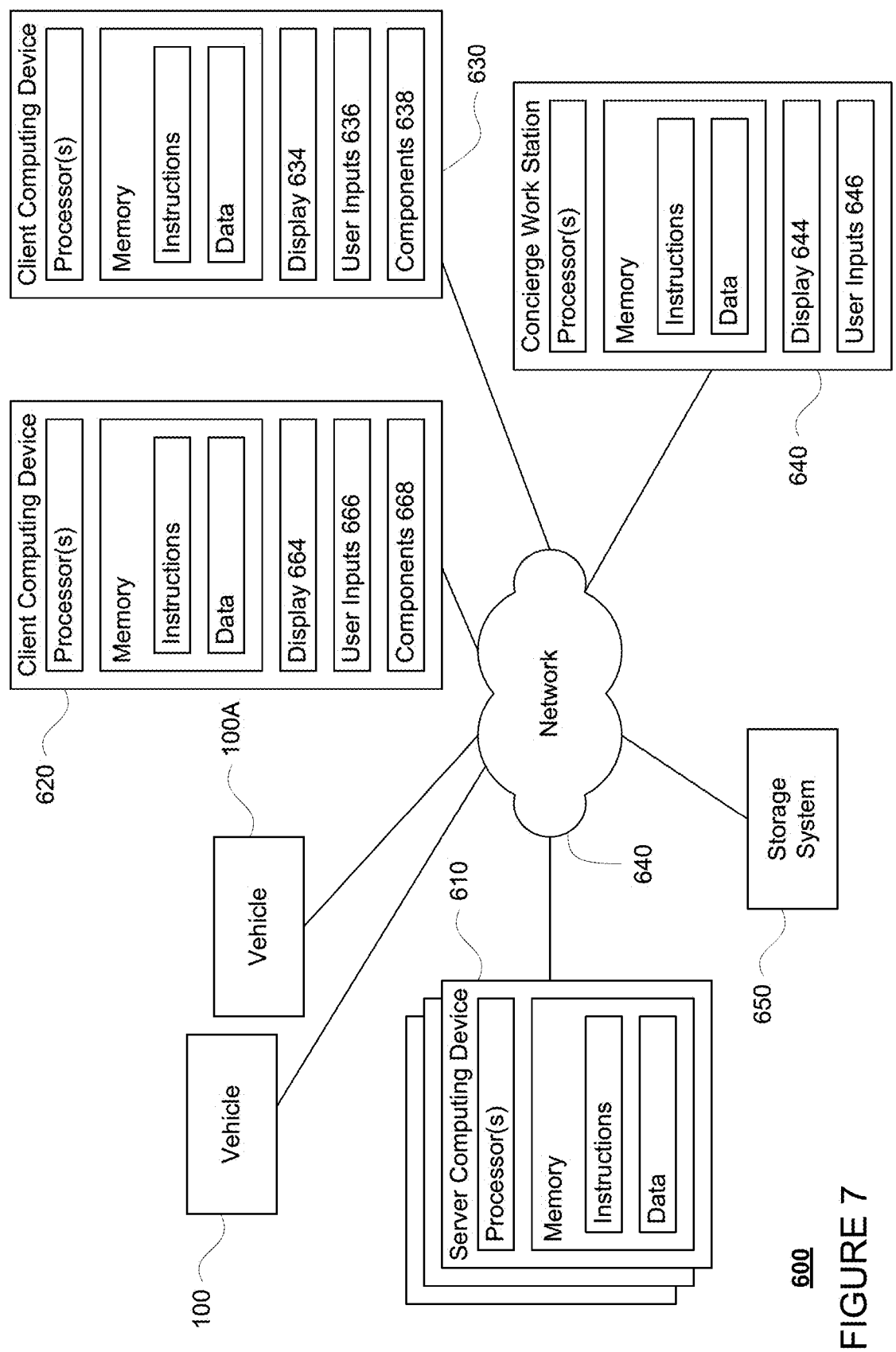
FIG. 7 is a pictorial diagram of the system of FIG. 6 in accordance with aspects of the disclosure.

The one or more computing devices 110 of vehicle 100 may also receive or transfer information to and from other computing devices. FIGS. 6 and 7 are pictorial and functional diagrams, respectively, of an example system 600 that includes a plurality of computing devices 610, 620, 630, 640 and a storage system 650 connected via a network 660. System 600 also includes vehicle 100, and vehicle 100A which may be configured similarly to vehicle 100. Although only a few vehicles and computing devices are depicted for simplicity, a typical system may include significantly more.

As shown in FIG. 6, each of computing devices 610, 620, 630, 640 may include one or more processors, memory, data and instructions. Such processors, memories, data and instructions may be configured similarly to one or more processors 120, memory 130, data 132, and instructions 134 of computing device 110.

The network 660, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with one or more computing devices 110 of vehicle 100 or a similar computing device of vehicle 100A as well as client computing devices 620, 630, 640 via the network 660. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 610 may use network 660 to transmit and present information to a user, such as user 622, 632, 642 on a display, such as displays 624, 634, 644 of computing devices 620, 630, 640. In this regard, computing devices 620, 630, 640 may be considered client computing devices.

As shown in FIG. 7, each client computing device 620, 630, 640 may be a personal computing device intended for use by a user 622, 632, 642, and have all of the components normally used in connection with a personal computing device including a one or more processors (e.g., a central processing unit (CPU)), memory (e.g., RAM and internal hard drives) storing data and instructions, a display such as displays 624, 634, 644 (e.g., a monitor having a screen, a touch-screen, a projector, a television, or other device that is operable to display information), and user input devices 626, 636, 646 (e.g., a mouse, keyboard, touch-screen or microphone). The client computing devices may also include a camera for recording video streams, speakers, a network interface device, and all of the components used for connecting these elements to one another.

Although the client computing devices 620, 630, and 640 may each comprise a full-sized personal computing device, they may alternatively comprise mobile computing devices capable of wirelessly exchanging data with a server over a network such as the Internet. By way of example only, client computing device 620 may be a mobile phone or a device such as a wireless-enabled PDA, a tablet PC, a wearable computing device or system, or a netbook that is capable of obtaining information via the Internet or other networks. In another example, client computing device 630 may be a wearable computing system, shown as a head-mounted computing system in FIG. 7. As an example the user may input information using a small keyboard, a keypad, microphone, using visual signals with a camera, or a touch screen.

In some examples, client computing device 640 may be concierge work station used by an administrator to provide concierge services to users such as users 622 and 632. For example, a concierge 642 may use the concierge work station 640 to communicate via a telephone call or audio connection with users through their respective client computing devices or vehicles 100 or 100A in order to ensure the safe operation of vehicles 100 and 100A and the safety of the users as described in further detail below. Although only a single concierge work station 640 is shown in FIGS. 6 and 7, any number of such work stations may be included in a typical system.

Storage system 650 may store various types of information as described in more detail below. This information may be retrieved or otherwise accessed by a server computing device, such as one or more server computing devices 610, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 650 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 610, such as a hard-drive, memory card, ROM, RAM, DVD, CD-ROM, write-capable, and read-only memories. In addition, storage system 650 may include a distributed storage system where data is stored on a plurality of different storage devices which may be physically located at the same or different geographic locations. Storage system 650 may be connected to the computing devices via the network 660 as shown in FIG. 6 and/or may be directly connected to or incorporated into any of the computing devices 110, 610, 620, 630, 640, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 622 and 632 may download the application via a link in an email, directly from a website, or an application store to client computing devices 620 and 630. For example, client computing device may transmit a request for the application over the network, for example, to one or more server computing devices 610, and in response, receive the application. The application may be installed locally at the client computing device.

The user may then use his or her client computing device to access the application and request a vehicle. As an example, a user such as user 632 may use client computing device 630 to send a request to one or more server computing devices 610 for a vehicle. The request may include information identifying a pickup location or area and/or a destination location or area. As an example, such location may be identified by street addresses, location coordinates, points of interest, etc. In response the one or more server computing devices 610 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Once the vehicle 100 receives the information dispatching the vehicle, the vehicle's one or more computing devices 110 may maneuver the vehicle to the pickup location using the various features described above. As the vehicle approaches the user's client device, the vehicle's computer may authenticate the user's client device and also the user. When the user is authenticated, the vehicle's computing devices may automatically unlock the vehicle's doors and allow the user to enter the vehicle. The vehicle's one or more computing devices 110 may also display a welcome screen on the internal electronic display 152. This welcome screen may provide instructions to the user (now a passenger) on how to use the vehicle. For example, the instructions may include requesting that the passenger shut the doors 306 if needed and buckle his or her seatbelt. Sensors associated with the seats, doors, and seatbelts may be used to determine if the passenger has complied. Once the passenger has complied with the instructions, he or she may press or otherwise activate button 514. In response, the computer 110 may initiate the necessary systems to control the vehicle autonomously along a route to the destination location.

Figure 8:
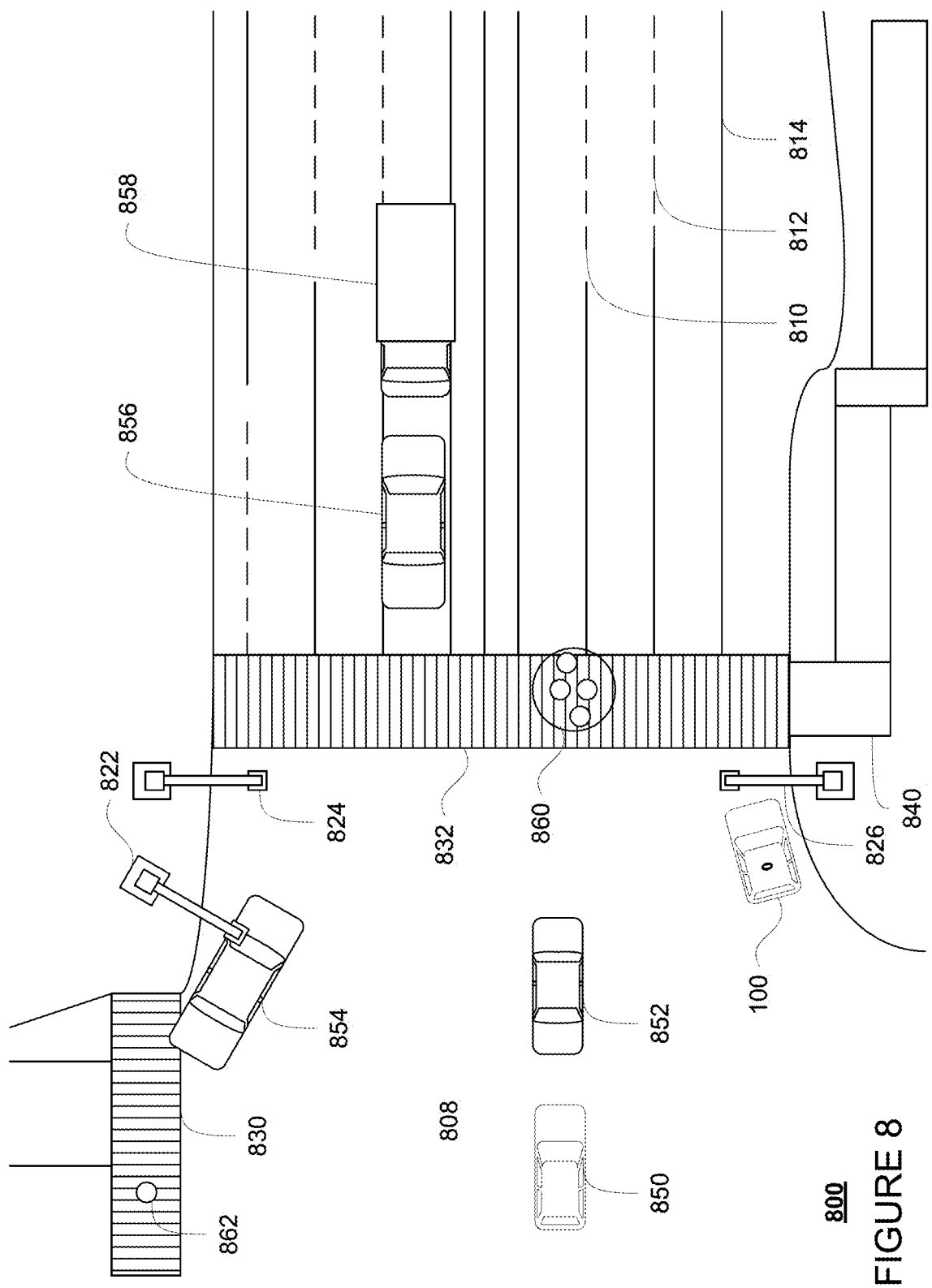
FIG. 8 is an example of an intersection in accordance with aspects of the disclosure.

As noted above, a vehicle's one or more computing devices may maneuver the vehicle using the various systems described above. For example, FIG. 8 depicts a section of roadway 800 including an intersection 808. Vehicle 100 is approaching intersection 808 and may be controlled, for example by one or more one or more computing devices 110 in an autonomous driving mode as described above. In this example, intersection 808 corresponds to the intersection 202 of the detailed map information 200, and vehicle is generally following rail 250 in order to follow a route towards the destination (both not shown in FIG. 8). In this example, lane lines 810, 812, and 814 correspond to the shape, location, and other characteristics of lane lines 210, 212, and 214, respectively. Similarly, crosswalks 830 and 832 correspond to the shape, location, and other characteristics of crosswalks 230 and 232, respectively, sidewalks 840 correspond to sidewalks 240, and traffic signal lights 822, 824, and 826 correspond to the shape, location, and other characteristics of traffic signal lights 222, 224 and 226.

As the vehicle is maneuvered to the destination, the vehicle's perception system 172 may detect and identify objects in the vehicle's environment. For instance, the vehicle's computing devices 110 may detect and identify lane lines 810, 812, and 814, crosswalks 830 and 832, sidewalks 840, and traffic signal lights 822, 824, and 826. In addition to these "static" features, the vehicle's perception system may also detect, track, and identify various other objects such as vehicles 850-858 and pedestrians 860, 862. In other words, the perception system 172 may determine the general shape and orientation as well as speed of these objects by observing these objects over a brief period of time.

When the vehicle operates in a semiautonomous or fully autonomous mode, the vehicle's computers may not only detect these objects, but also respond or react to them. For instance, this can include yielding to an object, stopping, maneuvering around an object, etc. Returning to the example of FIG. 8, vehicle 100 may need to yield to group of pedestrians 860 in crosswalk 832 as well as vehicle 852 which is passing through intersection 808 in the direction of pedestrians 860 in order to continue its route along rail 250 safely. In addition, the vehicle may have to respond to a red light at traffic signal light 826, but at the same time, may be permitted (according to the traffic laws which govern the intersection defined in the detailed map information 200) to make a right hand turn during the red light after properly stopping and yielding to other traffic. While the vehicle's computing devices 110 may detect and identify vehicles 850 and 854-858 as well as pedestrian 862, the vehicle's computing devices 110 may determine that no change to the vehicle's current actions is likely to be needed in the immediate future (such as the next few seconds or more or less). In other words, it is unlikely given the location, orientation, and speeds of vehicles 850 and 854-858 and pedestrian 862 and the route that vehicle 100 is following along rail 250, that vehicle 100 would need to take any action in order to avoid these objects in the immediate future.

An in-vehicle display can display information about how the vehicle's computers plan to react to those objects, or rather, the vehicle's intent. In this regard, the in-vehicle display can include a scene display for displaying a one or more representative objects and a scene corresponding to an area around the vehicle and an intent display for displaying intent of the vehicle with respect to one or more of these objects.

Figure 9:
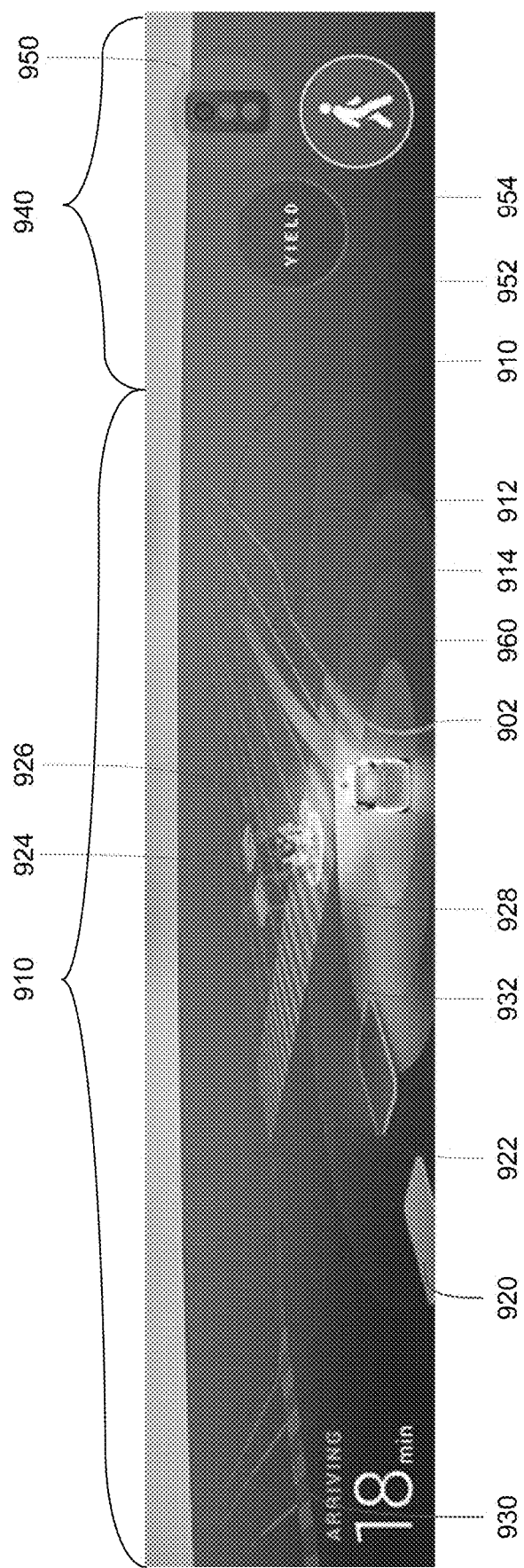
FIG. 9 is an example of a display in accordance with aspects of the disclosure.

FIG. 9 is an example display 900 which may be presented to an occupant of the vehicle on internal electronic display 152 while the vehicle is being maneuvered to the destination. In this example, display 900 includes a scene display 910 which displays a scene corresponding to section of roadway 800 of FIG. 8. This scene includes a background image displayed in a background color scheme, here in blues and silvers. The background images corresponds to features of the detailed map information 200 such as lane lines 910, 912, and 914 and crosswalks 930 and 932, which correspond to lane lines 210, 212, and 214 and crosswalks 230 and 232, respectively. In addition, the display 910 includes representations of various objects 920-928 which correspond to vehicles 850, 852, 856, and 858 as well as group of pedestrians 860, respectively. The display 910 also includes a representation 902 of vehicle 100 and a representation 960 of a path corresponding to rail 250 that the vehicle is currently following to reach the destination.

In addition to scene display 910, display 900 also includes an intent display 940 for display the vehicle's intent with regard to various of the representations in the scene display 910. For instance, intent display 940 includes a plurality of two-dimensional intent icons 950, 952, and 954. Although the term "icon" is used throughout to refer to a representations of the vehicle's intent, this term as used herein may include other types of representations, such as photographs, jpegs, pdfs, or other types of images.

In the example of intent display 940, intent icon 950 indicates that the vehicle's computing devices 110 recognize that traffic signal light 826 is currently displaying a red (stop) light such that vehicle 100 must stop before intersection 808 and yield to other objects crossing intersection 808 in order to make a lawful right turn as discussed above. Intent icons 952 and 954 indicate that the vehicle's computing devices intend to yield to group of pedestrians 860 represented by representations 928 and to vehicle 852 represented by representation 922.

The scene and intent displays can be arranged in various ways. For instance, the scene display and intent display may be displayed on the same or different electronic displays of the vehicle. The intent display may therefore actually include a sub-area of the scene display such as a side or corner area of the scene display such that the intent display appears to overlap or is overlaid or superimposed on the scene display. Similarly, the intent display and the scene display may be depicted as discrete areas of an electronic display such that there is no overlap or overlay as shown in FIG. 9.

Figure 10:
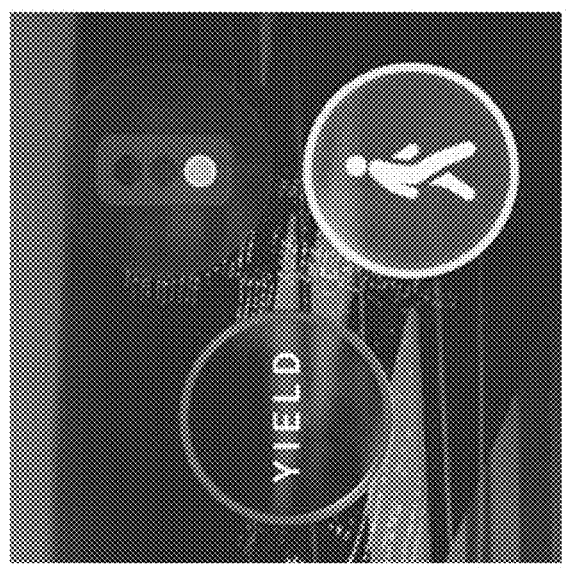
FIG. 10 is example representations of objects in accordance with aspects of the disclosure.
Figure 10:
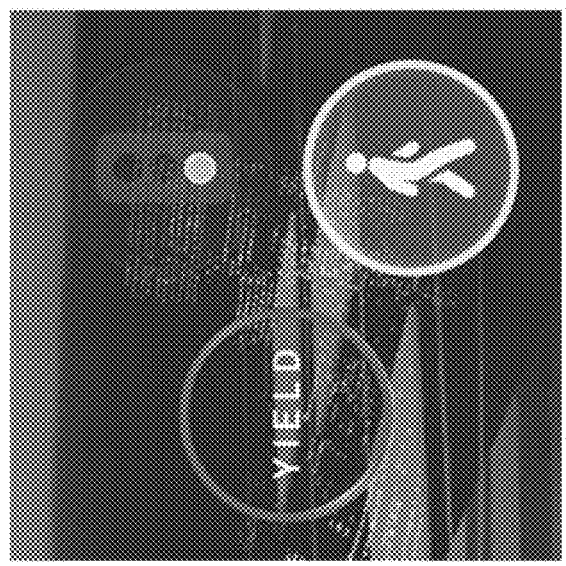
Figure 10:
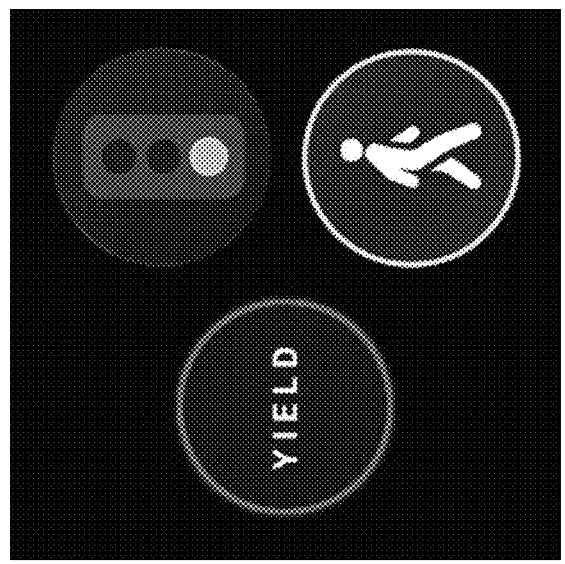

FIG. 10 is an example of three different intent displays 1010, 1020, and 1030, providing the different information from intent display 950 of FIG. 9, but a similar arrangement of two intent icons and one traffic signal light icon. In the example of intent display 1010, the icons are shown on a black field as if the intent display 1010 were separately arranged from intent display 910, such as on another internal electronic display of vehicle 100 or as a discrete portion of display 900. Intent displays 1020 and 1030 are displayed as if superimposed over scene display 910 allowing for features of the background scene to be displayed "behind" the icons of the intent display. Display 1030 shows the background features behind the icons with a blur to further distinguish the icons from the background features.

In addition, the scene display and intent display may be distinguished based on how the features in these displays are depicted. As an example, the scene of the scene display 910 may be a three-dimensional (3D) image having a depth while the features of the intent display 940 may appear to be flat or two-dimensional (2D). Alternatively, both the scene and intent displays may appear to be in 2D or 3D.

The relationship between a representative object and the vehicle's intent relative to an object may be presented using colors. As an example, pedestrian representation 928 shown in the scene display 910 may have a yellow ring or other indicator such as a pointer or marker located nearby the representation. At the same time, the corresponding intent icon 954, indicating the vehicle's computing devices 110's intent to yield (or simply an acknowledgement that an object has been identified as a pedestrian), may be displayed in the same or a similar color (here yellow) or with a ring in a same or a similar color (here yellow) in the intent display 940. This may indicate the vehicle's computing devices 110's intent to yield to the group of pedestrians 862 in a way in which an occupant of vehicle 100 may quickly and easily recognize. Although not shown in the example of FIG. 9, the intent display 940 may also be used to identify corresponding intent icons for other types of objects such as bicyclists, constructions zone objects like cones or barriers, etc.

Figure 13:
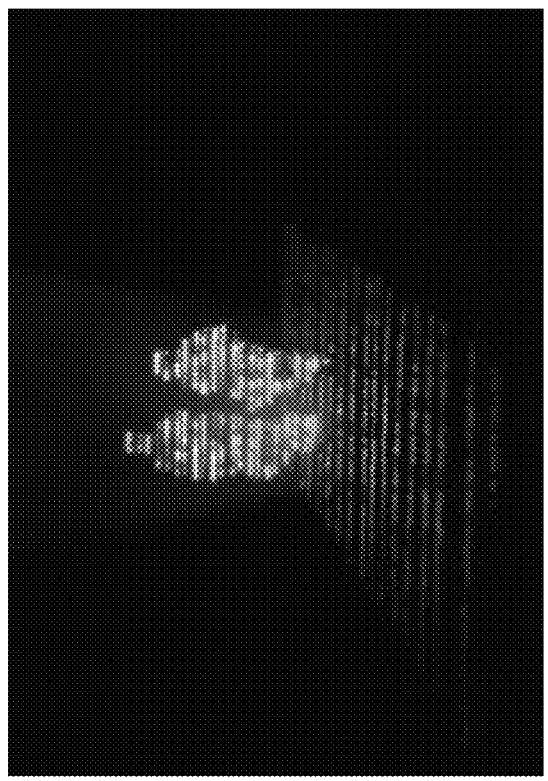
FIG. 13 is example representations of objects in accordance with aspects of the disclosure.
Figure 13:
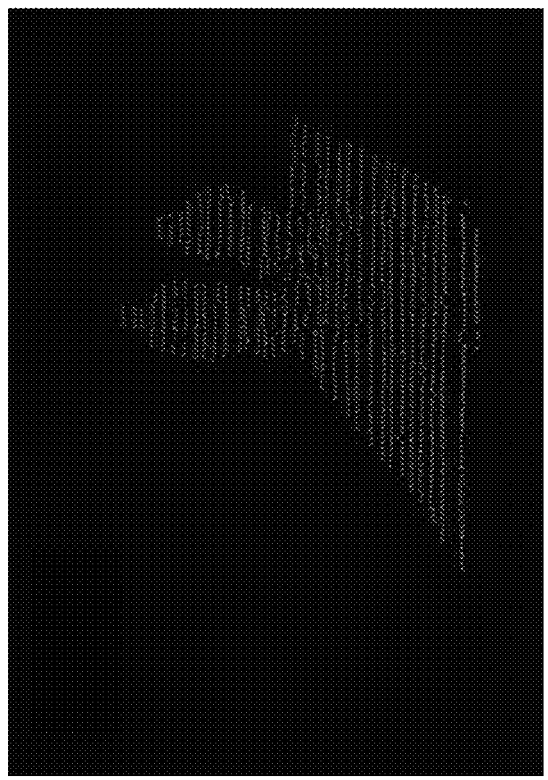

In other examples, objects need not include rings or other markers to identify corresponding intent icons, but may be shown in a corresponding color as the intent icon or a ring of the intent icon. For instance, representation 922 of vehicle 852 is shown in the scene display 910 in purple to correspond with the purple ring of intent icon 952 in the intent display 940. This may indicate the vehicle's computing devices 110's intent to yield to the vehicle 852 in a way in which an occupant of vehicle 100 may quickly and easily recognize. Similarly, turning to FIG. 13, representation 1310 of pedestrians is shown in silver to blend with the background color scheme as these pedestrians do not correspond to an intent icon, while representation 1320 of pedestrians is shown highlighted in yellow to correspond to the yellow ring and color of an intent icon, such as intent icon 954. The corresponding color of the representation may be instead of or in addition to a colored ring or marker (as in the example of scene display 910.

Also, representations of different types of objects can be shown in the same color and/or with the same color ring or marker in the scene display when the same intent is indicated for those representations in the intent display. As an example, if the vehicle 100 is yielding to both a bicyclist and a vehicle, both representations of these objects may be shown in purple and/or with a purple ring. However, in some cases, such as in the example of display 900, it may be clearer and more reassuring to the occupant if different intent icons are used for different objects to enable the occupant to understand that the vehicle's computing devices 110 have recognized the differences in how the vehicle should respond to a group of pedestrians (shown by representation 928) and a vehicle (shown by representation 922). Of course, the colors, shapes, markers, and icons used may be changed according to the number of objects and intent or aesthetics of the display.

In addition, to distinguish between intents for different objects of a similar type, the rings and/or colors for the different intent icons and representations may be displayed in different colors. As an example, a ring around one pedestrian may correspond in color to a ring for an intent to yield icon while a ring around another pedestrian may correspond in color to a ring for an intent to stop icon (not shown).

Of course, the colors and shapes may be changed according to the number of objects and intent or aesthetics of the display. For instance, in addition or alternatively to the examples of yellows and purples discussed above, reds, greens, oranges, and other such colors may also be used. In addition, although the example of FIG. 9 depicts the same shades of yellow and purple between the scene and intent displays, similar hues of the same color (a lighter shade of red and a corresponding darker shade of red, etc.) may also be used to identify correspondences between the intent icons in the intent display and representations in the scene display. Similarly, in addition or alternatively to the rings and shapes discussed above, other shapes, such as polygons, etc. may also be used.

In many examples, the vehicle's perception system 172 will detect significantly more objects in the vehicle's external environment than are useful or helpful to display to a passenger or occupant of the vehicle. Objects that are identified must therefore be filtered before representations of those objects are included in the display 900. By doing so, this will reduce the amount of "clutter" in the object display.

Filtering may be achieved, for example, using various heuristics related to the vulnerability of an object (pedestrians and bicyclists having higher priority than other objects unless those other objects are doing something else interesting), the category of action for the object (moving in the same lane, merging, turning into the lane, etc.), whether the vehicle needs to take an action to avoid the object (change lanes, slow down, turn the wheels, etc.), distance from the vehicle, speed of the object, etc. For example, representations of pedestrian 860 and vehicle 854 are not included in the scene display 910. In this example, even though pedestrian 860 is detected by vehicle 100, it may be out of a field of view presented in the scene display 910. Alternatively, if pedestrian 860 is within the field of view presented in the scene display, a representation of pedestrian 860 may not be displayed in the scene display because the pedestrian is not currently relevant to the vehicle, or rather, the location of pedestrian relative to the vehicle 100 is unlikely to affect vehicle 100's route to the destination or require some action by the one or more computing devices 110 in order to safely navigate vehicle 100 along the route. In other words, it is unlikely that the vehicle 100 would need to respond to this pedestrian. In yet another alternative, even where pedestrian is within the field of view but not currently relevant (as discussed above), a representation of the pedestrian may be included because of the vulnerable nature of pedestrians. In doing so, this may allow an occupant of the vehicle to feel more comfortable in that the vehicle is able to recognize pedestrians in the vehicle's environment.

Returning to the example of FIG. 9, a representation of vehicle 854 may not be included in the scene display because the location, orientation, and speed of vehicle 854 relative to vehicle 100 is unlikely to affect vehicle 100 as it continues along the route, in other words, vehicle 100 is not likely to need to respond to vehicle 854. At the same time, representations of vehicle 856 and 858 are included in the scene display 910 because in this example, even though vehicles 856 and 858 are moving towards intersection 808 and in a different direction from vehicle 100 such that vehicle 100 is unlikely to need to respond to vehicles 856 and 858, vehicle 100 is actually approaching vehicles 856 and 858. In other words, vehicle 100 will be getting closer to these vehicles in the near future, while vehicle 854 will likely continue to move away from vehicle 100. Thus, in this situation, representations 924 and 926 may be included in the scene display in order to indicate that the vehicle has detected these vehicles. Of course, once vehicles 856 and 858 move into intersection 808 and vehicle 100 continues further down rail 250, vehicles 856 and 858 will become less relevant to vehicle 100. At this time, representations 924 and 926 may fade or disappear from the scene display 910 indicating that vehicles 856 and 858 have become less relevant to the vehicle 100.

In addition, certain road features identified the detailed map information, such as construction zones or traffic signal lights, may be omitted from the scene display, but the intent for those features (cautious or slower than usual driving and/or stopping) may still be indicated in the intent display. For example, representations of traffic signal lights 822, 824, and 826 are not included in the scene display 910 in order to reduce the amount of clutter and unnecessary items shown in the display 900. However, at the same time, relevant information regarding traffic signal lights which are of importance or relevance to the vehicle 100 given its current position, may be included in the intent display 940, as can be seen from intent icon 950.

In some instances, representations of different types or categories of objects can be shown in the scene display using different image treatments in order to quickly and easily indicate information about the objects to a passenger in the vehicle. For example, representations of static objects or background features from the detailed map information 200, such as lane lines 910, 912, and 914, crosswalks 930 and 932, or other road features, may be displayed in one color scheme (i.e. all blues or grays), while representations of objects not in the detailed map information that are relevant to vehicle 100, such as representation 922 of vehicle 852, representation 928 of group of pedestrians 862, or bicyclists (not shown) may be shown in different colors in order to distinguish them from the background scene and color scheme.

For instance, representations of moving objects, such as representations 922 and 928 to which the vehicle is actually reacting (i.e. changing its behavior to slow down, yield, etc.) may be distinguished from the background features using different colors. This may indicate to the occupant that these objects are of relevant for controlling the vehicle 100 safely as discussed above. At the same time, moving objects which do not affect the vehicle's behavior may also be shown in the background color scheme such as representations 920, 924, and 926 to indicate that they are not currently relevant to controlling the vehicle 100 safely.

Figure 11:
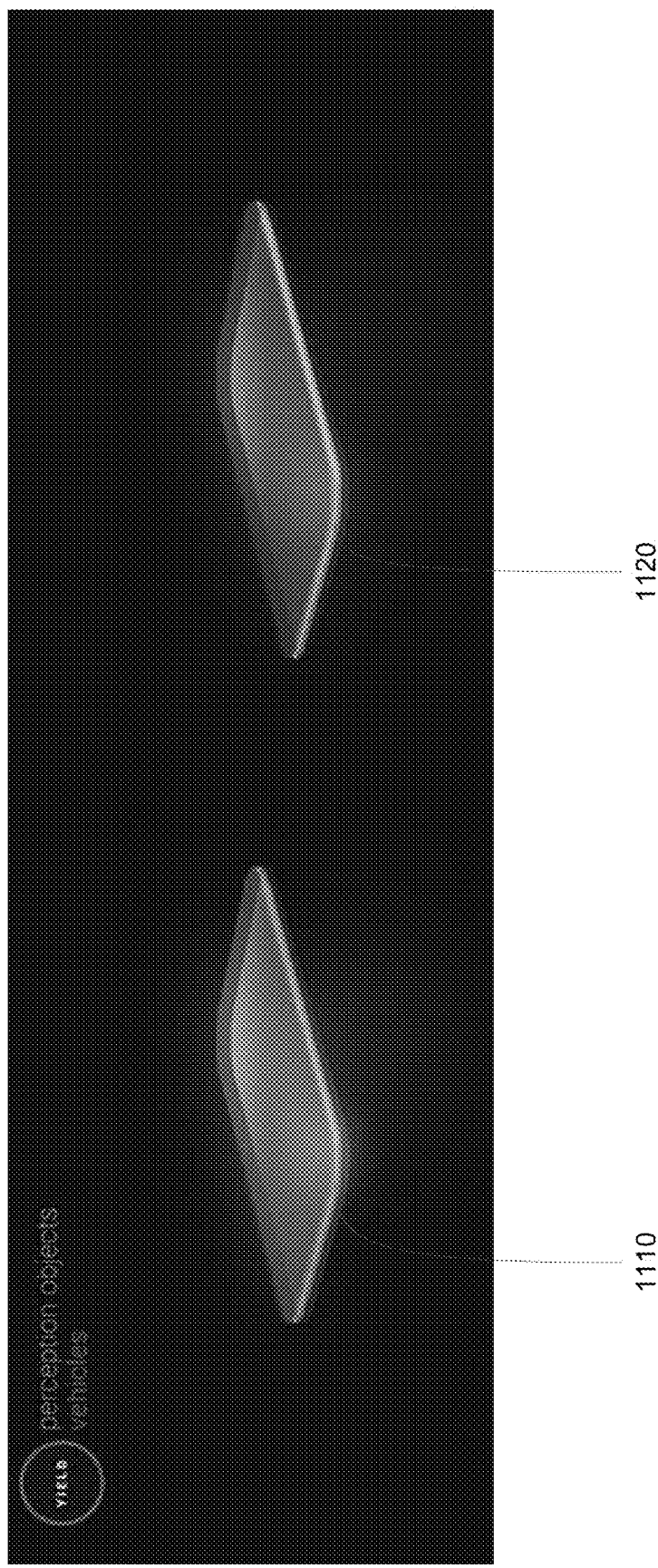
FIG. 11 is further example representations of objects in accordance with aspects of the disclosure.

FIG. 11 is an example view 1100 of a representation 1110 of a vehicle (similar to representation 922) to which vehicle 100 is reacting and a representation 1110 similar to representation 920) of a vehicle to which vehicle is not reacting. In this example, representation 1120 is displayed in a first color, here purple which stands out from the background color scheme of display 900, and representation 1120 is shown in a different second color, here blue, which blends or corresponds with the background color scheme of display 900.

Figure 12:
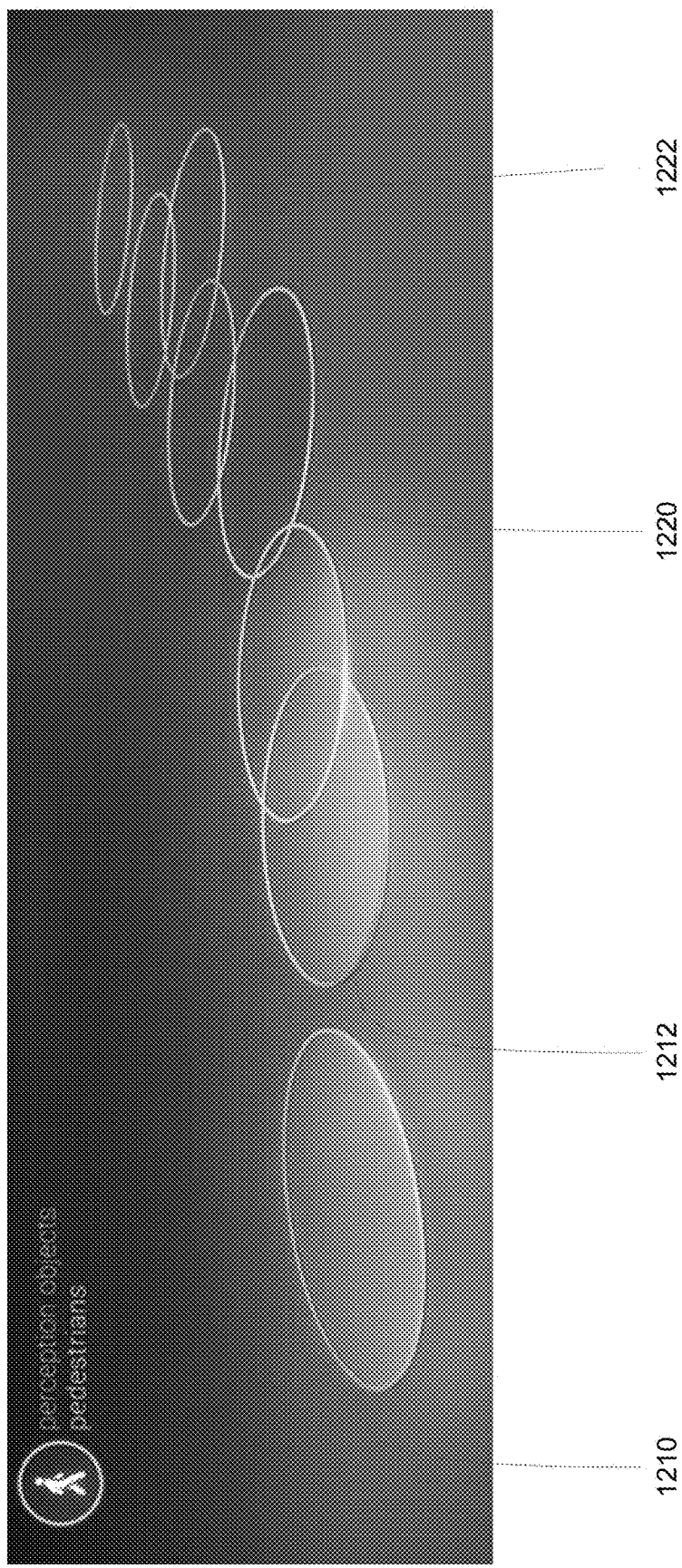
FIG. 12 is additional example representations of objects in accordance with aspects of the disclosure.

FIG. 12 is an example view 1200 of rings 1210 and 1212 which would surround a representation of a pedestrian, bicyclist or other object (similar to representation 928) to which vehicle 100 is reacting and rings 1220 and 1222 of a pedestrian, bicyclist or other object to which vehicle is not reacting. In this example, rings 1210 and 1212 are displayed in a first color, here yellow which stands out from the background color scheme of display 900, and rings 1220 and 1222 are shown in a different second color, here silver, which blends or corresponds with the background color scheme of display 900.

In this regard, as objects become more or less important, their prominence or relevance to controlling the vehicle 100 can be represented through changes in the color of the representations of those objects as shown in the scene display. As an example, another vehicle in front of the vehicle may change from a brighter color to a duller color when the other vehicle has turned onto a different roadway. This may be because the other vehicle has become less or no longer relevant to controlling vehicle 100 and/or the vehicle's computer has determined that the other vehicle no longer should be displayed as relevant. Thus, the other vehicle will appear to "fade" into the background of the scene display for example by changing form the representation 1110 to the representation 1120 of FIG. 11. In another example, another vehicle which moves into the vehicle's lane in front of the vehicle may change from a color of the background scheme to a brighter color as it becomes more relevant to the vehicle, for example, by changing from the representation 1120 to the representation 1110. In this example, the other vehicle goes from being not relevant to currently relevant to controlling the vehicle 100.

In another example, turning to FIG. 12, pedestrian rings 1210 and 1212 are used to highlight representations of pedestrians to which the vehicle 100 is responding whereas rings 1220 and 1222 are silver and allow the representations to blend into the background color scheme. By switching between these different colored rings, the vehicle's computing devices 110 can easily convey the relevant or importance of these objects to the actions of the vehicle 100. Alternatively, rather than changing colors to blend into or stand out from the background color scheme, the rings may simply disappear or appear.

Similarly, the scene display 910 may show a representation 960 of a path of the vehicle which also fades to the background color scheme when the vehicle has come to a stop or is temporarily yielding to an object. The path may correspond to rail 250 or a portion of a route to the destination. In this regard, the changing of the color of the path from one color that stands out from the background scene to another that blends with the background scene may easily indicate to the occupant that the stop or yield maneuver is a temporary one and that the vehicle will resume the route shortly.

In addition, specific types of the moving objects may be represented in the scene display in different ways. As an example, more vulnerable types of objects, such as pedestrians and bicyclists, may be shown using laser point clouds, as in the example of representation 920 of FIG. 9. Point clouds allow an occupant to potentially pick up on details of a pedestrian or bicyclist such as what direction they are facing or moving. Other less vulnerable objects, such as vehicles, may be represented using a more abstract representation such as a box, tray or stylized cuboid as in the examples of representations 920-926. In this regard, different types of vehicles, such as passenger car 856 and tractor trailer 858, are depicted in the scene display with the same types of generic representations 924 and 926. In other words, the representations 924 and 926 are the same shape and size relative to their three-dimensional distance from the representation 902 of vehicle 100 in the scene display 910 (i.e. representations of objects located further from representation 902 of vehicle 100 will appear smaller than representations of objects located closer to representation 902 of vehicle 100). In this regard, by viewing the scene display, the occupant would recognize that the representations 924 and 926 in the scene display 910 correspond to vehicles but not the specific types of those vehicles. These more generic representations in combination with the point cloud representations given an occupant a good sense that the vehicle has identified different objects and can also distinguish between vulnerable and less vulnerable objects.

In order to further indicate the relationship between an object in the scene display with an intent icon in the intent display and the direction of the object relative to the vehicle, additional color cues may be used. For instance, as shown in FIG. 9, a series of rings or circles may be displayed in the scene display 910 in order to indicate different distances from the representation 902. Sections of these circles may be highlighted in order to indicate the direction of an object. The highlighting may be in a coordinating color as a feature of the object that is colored to coordinate with an intent icon. For example, section 970 is highlighted in yellow to indicate the direction of group of pedestrians 860 represented by representations 928 relative to the representation 902 of vehicle 101. This yellow color further indicates the relationship of the representation 920 with intent icon 954, also shown in yellow. Similarly, section 972 is highlighted in purple to indicate the direction vehicle 852 represented by representation 922 relative to the representation 902 of vehicle 101. Again, this purple color further indicates the relationship of the representation 922 with intent icon 952, also shown in purple. In addition, the tips or narrow ends of these sections are oriented towards the representation 902 and the wide ends are oriented towards representations 922 and 928.

Figure 14:
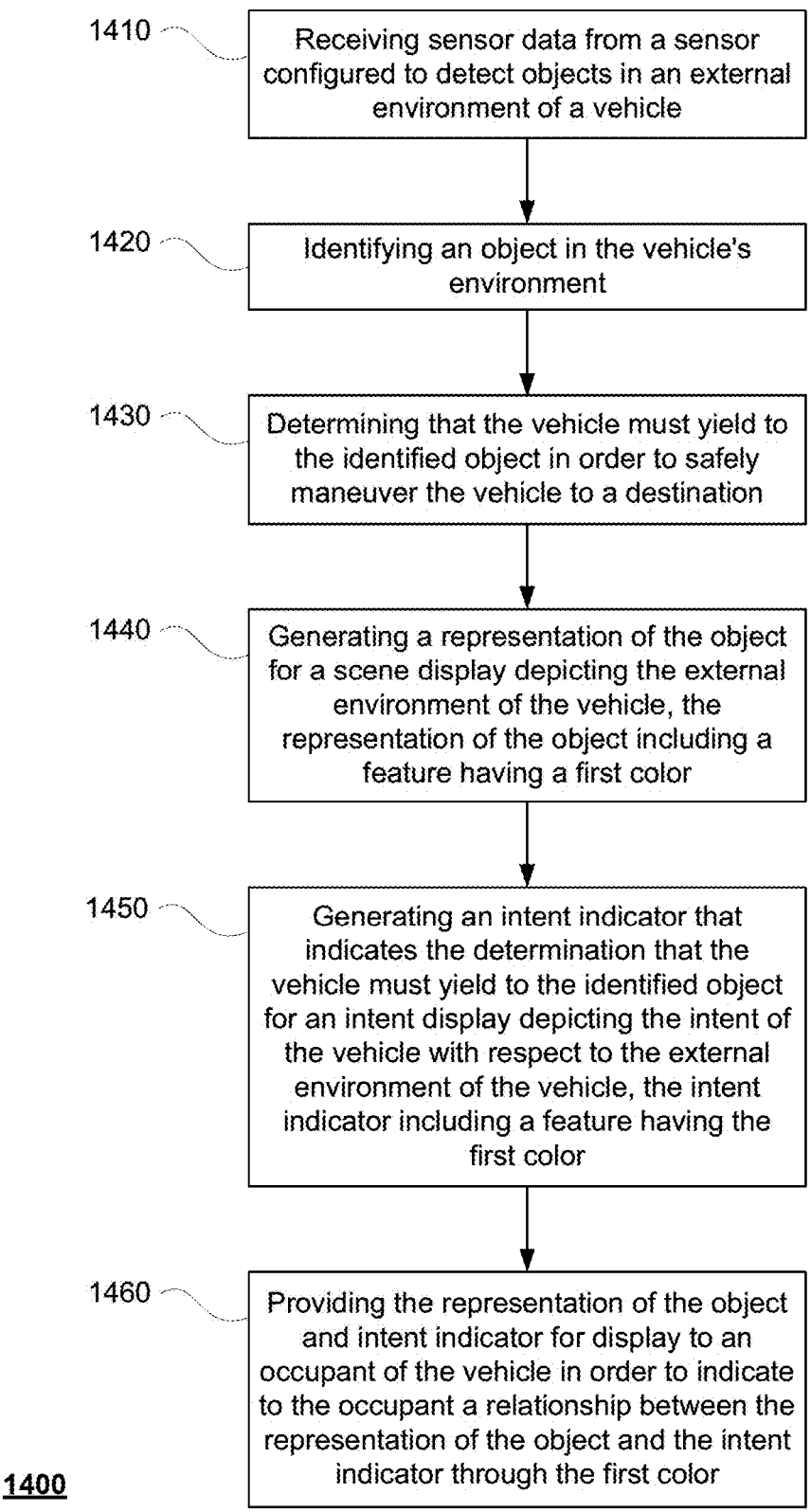
FIG. 14 is an example flow diagram in accordance with aspects of the disclosure.

FIG. 14 is an example flow diagram 1400 that may be performed by one or more of the computing devices 110. In this example, sensor data is received from a sensor configured to detect objects in an external environment of a vehicle at block 1410. An object in the vehicle's environment is identified at block 1420. It is determined that the vehicle must yield to the identified object in order to safely maneuver the vehicle to a destination at block 1430. A representation of the object is generated for a scene display depicting the external environment of the vehicle at block 1440. The representation of the object includes a feature having a first color. An intent indicator that indicates the determination that the vehicle must yield to the identified object is generated for an intent display depicting the intent of the vehicle with respect to the external environment of the vehicle at block 1450. The intent indicator includes a feature having the first color. The representation of the object and intent indicator are provided for display to an occupant of the vehicle in order to indicate to the occupant a relationship between the representation of the object and the intent indicator through the first color at block 1460.

Figure 15:
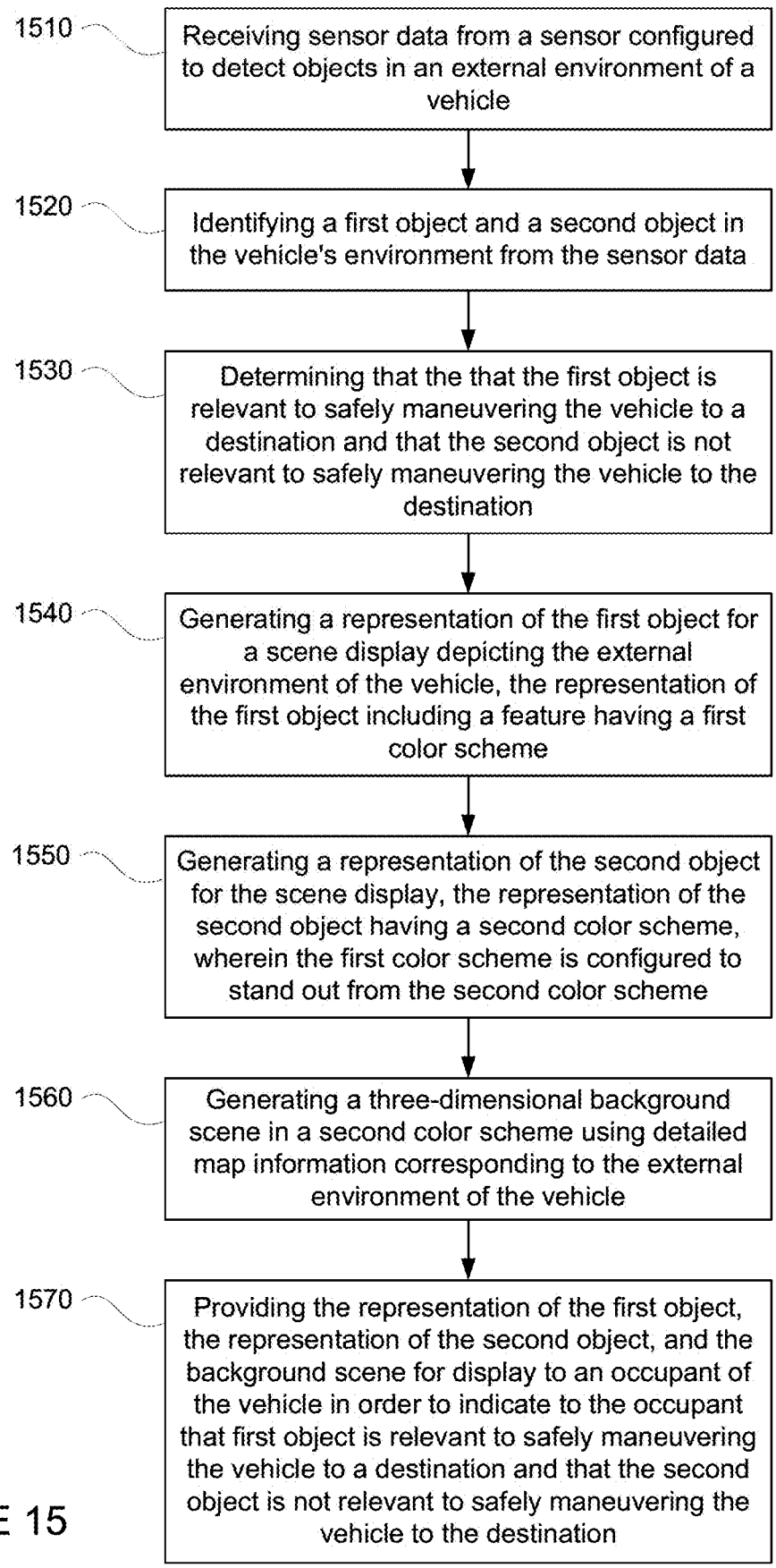
FIG. 15 is an example flow diagram in accordance with aspects of the disclosure.

FIG. 15 is an example flow diagram 1500 that may be performed by one or more of the computing devices 110. In this example, sensor data is received from a sensor configured to detect objects in an external environment of a vehicle at block 1510. A first object and a second object are identified in the vehicle's environment from the sensor data at block 1520. It is determined that the first object is relevant to safely maneuvering the vehicle to a destination and that the second object is not currently relevant to safely maneuvering the vehicle to the destination at block 1530. A representation of the first object is generated for a scene display depicting the external environment of the vehicle at block 1540. The representation of the first object includes a feature having a first color scheme. A representation of the second object is generated for the scene display at block 1550. The representation of the second object has a second color scheme. The first color scheme is configured to stand out from the second color scheme. A three-dimensional background scene is generated in the second color scheme using detailed map information corresponding to the external environment of the vehicle at block 1560. The representation of the first object, the representation of the second object, and the background scene are provided for display to an occupant of the vehicle in order to indicate to the occupant that first object is relevant to safely maneuvering the vehicle to a destination and that the second object is not currently relevant to safely maneuvering the vehicle to the destination.

Figure 16:
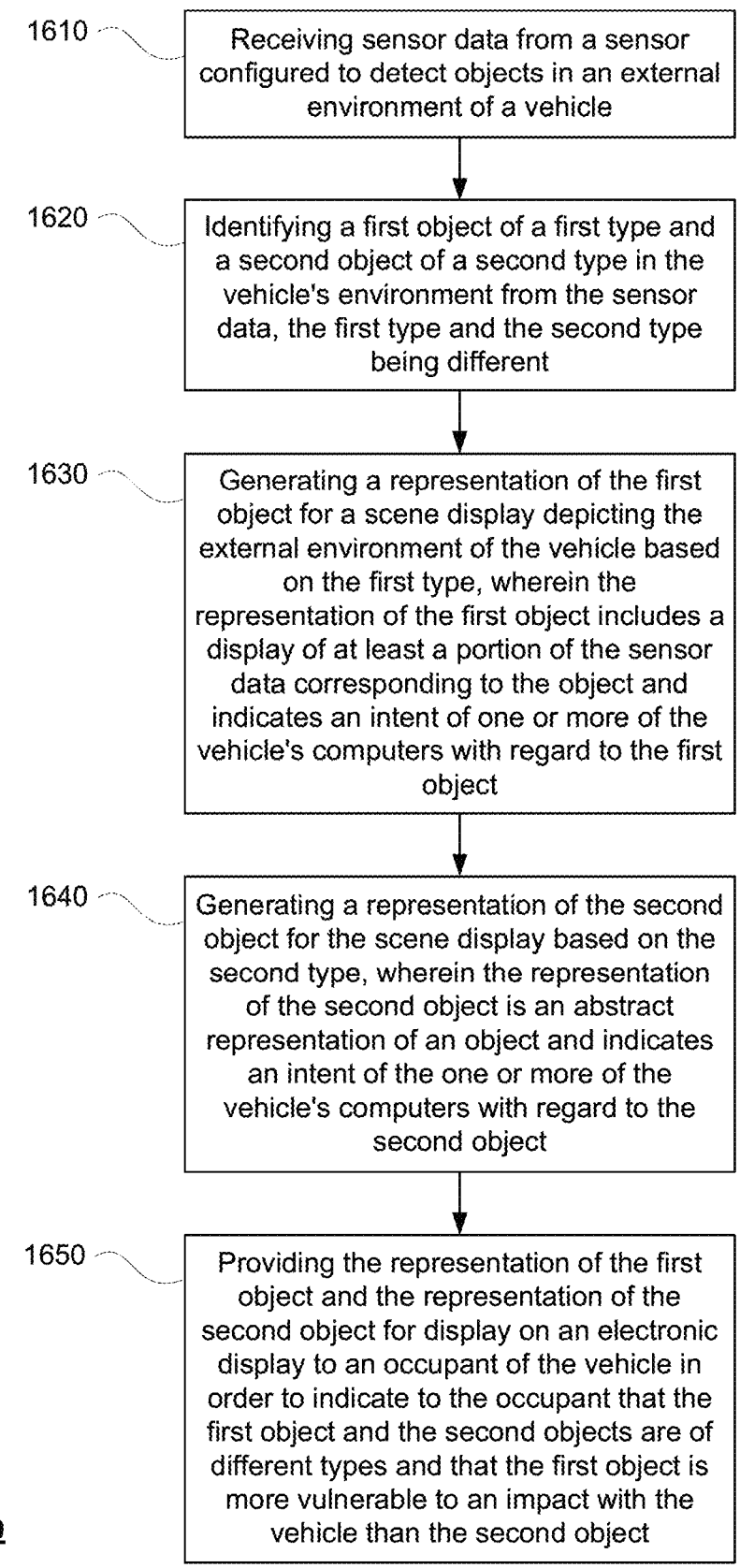
FIG. 16 is an example flow diagram in accordance with aspects of the disclosure.

FIG. 16 is an example flow diagram 1600 that may be performed by one or more of the computing devices 110. In this example, sensor data is received from a sensor configured to detect objects in an external environment of a vehicle at block 1610. A first object of a first type and a second object of a second type are identified in the vehicle's environment from the sensor data at block 1620. The first type and the second type are different. A representation of the first object is generated for a scene display depicting the external environment of the vehicle based on the first type at block 1630. The representation of the first object includes a display of at least a portion of the sensor data corresponding to the object and indicates an intent of one or more of the vehicle's computers with regard to the first object. A representation of the second object for the scene display based on the second type is generated at block 1640. The representation of the second object is an abstract representation of an object and indicates an intent of the one or more of the vehicle's computers with regard to the second object. The representation of the first object and the representation of the second object are provided for display on an electronic display to an occupant of the vehicle in order to indicate to the occupant that the first object and the second objects are of different types and that the first object is more vulnerable to an impact with the vehicle than the second object at block 1650.

Figure 17:
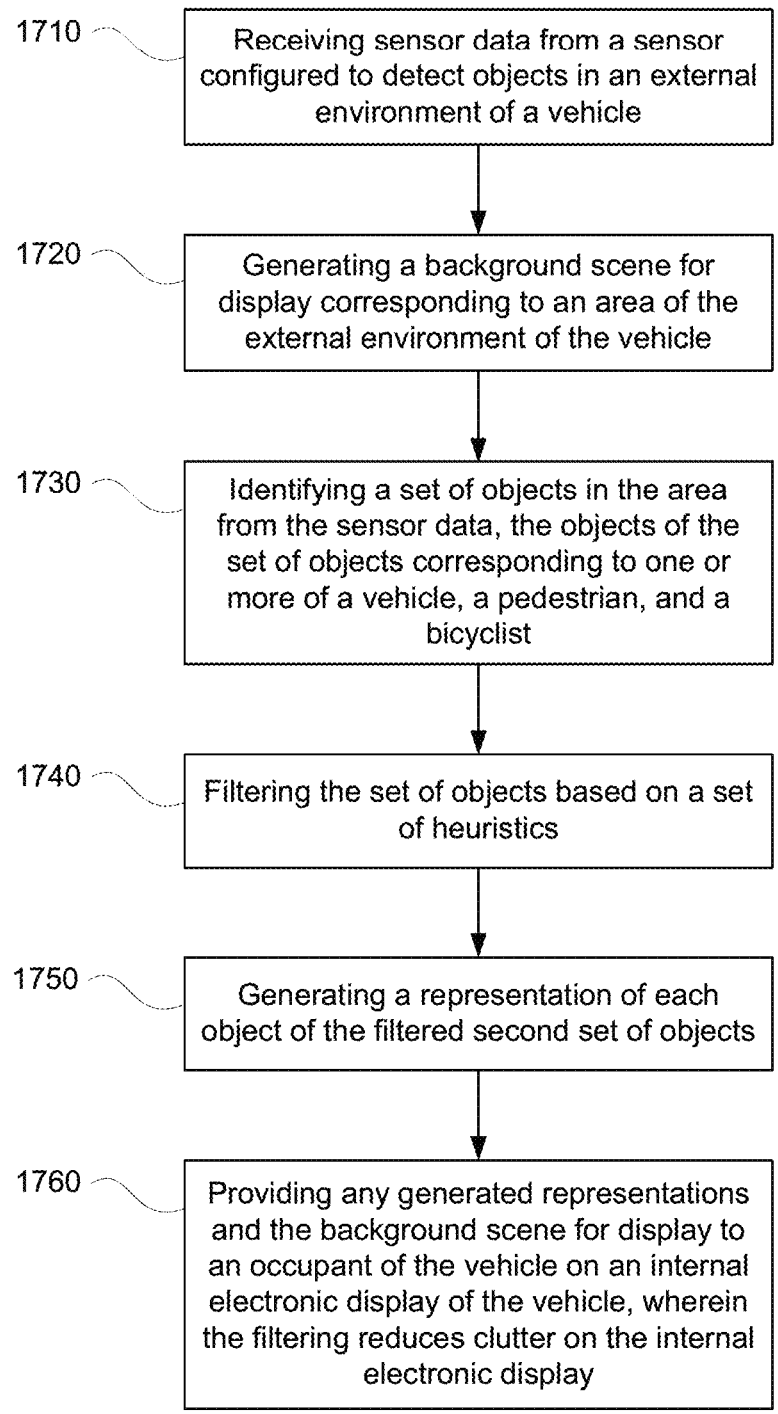
FIG. 17 is an example flow diagram in accordance with aspects of the disclosure.

FIG. 17 is an example flow diagram 1700 that may be performed by one or more of the computing devices 110. In this example, sensor data is received from a sensor configured to detect objects in an external environment of a vehicle at block 1710. A background scene is generated for display corresponding to an area of the external environment of the vehicle at block 1720. A set of objects in the area is identified from the sensor data at block 1730. The objects of the set of objects correspond to one or more of a vehicle, a pedestrian, and a bicyclist. The set of objects is filtered based on a set of heuristics at block 1740. A representation of each object of the filtered second set of objects is generated at block 1750. Any generated representations and the background scene are provided for display to an occupant of the vehicle on an internal electronic display of the vehicle at block 1760. The filtering reduces clutter on the internal electronic display.

Although the examples above relate to a particular configuration for the images depicted on the internal electronic display 152, various other arrangements and features may be used to increase safety and comfort of occupants of the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, by one or more processors, sensor data from one or more sensor systems configured to detect objects in an external environment of a vehicle;
identifying, by the one or more processors, an object in the vehicle's external environment using the sensor data;
generating, by the one or more processors, a representation of the object for a scene display depicting the external environment of the vehicle, the representation of the object including an object feature;
generating, by the one or more processors, an intent indicator for an intent display depicting an intent of the vehicle with respect to the external environment of the vehicle, the intent indicator including an intent indicator feature;
generating a three-dimensional background scene using map information corresponding to the external environment of the vehicle; and
providing, by the one or more processors, the representation of the object and intent indicator for display to an occupant of the vehicle in order to indicate to the occupant a relationship between the representation of the object and the intent indicator,
wherein the three-dimensional background scene is provided as a background for the representation of the object including the object feature,
wherein the intent indicator with the intent indicator feature is configured to be overlaid onto the three-dimensional background scene, and
wherein, when the intent indicator is overlaid on the three-dimensional background scene, an area within the intent indicator which overlays a portion of the scene display includes a blur effect for the portion in order to distinguish the intent indicator from the scene display.

2. The method of claim 1, wherein the representation of the object is provided for display in a first area of an electronic display corresponding to the scene display, and the intent indicator is provided for display in a second area of an electronic display distinct from the scene display.

3. The method of claim 1, wherein the representation of the object is provided for display in a first area of an electronic display corresponding to the scene display, the intent indicator is provided for display as an overlay on the first area of the electronic display over the scene display.

4. The method of claim 1, wherein the object feature is a first ring, and the intent indicator feature is a second ring.

5. The method of claim 1, wherein the object feature is a first ring drawn around a depiction of sensor data corresponding to the object and the intent indicator feature is a second ring drawn around a depiction of intent of one or more computing devices of the vehicle.

6. The method of claim 1, wherein the object feature is an abstract depiction of the object and the intent indicator feature is a ring drawn around a depiction of intent of one or more computing devices of the vehicle.

7. The method of claim 1, wherein the intent indicator further includes a text describing the intent of the vehicle with respect to the external environment of the vehicle.

8. The method of claim 1, wherein the intent indicator is a two-dimensional image.

9. A system comprising one or more computing devices having one or more processors configured to:
  receive sensor data from one or more sensor systems configured to detect objects in an external environment of a vehicle;
  identify an object in the vehicle's external environment using the sensor data;
  generate a representation of the object for a scene display depicting the external environment of the vehicle, the representation of the object including an object feature;
  generate an intent indicator for an intent display depicting an intent of the vehicle with respect to the external environment of the vehicle, the intent indicator including an intent indicator feature;
  generate a three-dimensional background scene using map information corresponding to the external environment of the vehicle; and
  provide the representation of the object and intent indicator for display to an occupant of the vehicle in order to indicate to the occupant a relationship between the representation of the object and the intent indicator,
  wherein the three-dimensional background scene is provided as a background for the representation of the object including the object feature,
  wherein the intent indicator with the intent indicator feature is configured to be overlaid onto the three-dimensional background scene, and
  wherein, when the intent indicator is overlaid on the three-dimensional background scene, an area within the intent indicator which overlays a portion of the scene display includes a blur effect for the portion in order to distinguish the intent indicator from the scene display.

10. The system of claim 9, wherein the one or more processors are further configured to:
  provide the representation of the object for display in a first area of an electronic display corresponding to the scene display, and
  provide intent indicator in a second area of an electronic display distinct from the scene display.

11. The system of claim 9, wherein the one or more processors are further configured to;
  provide the representation of the object for display in a first area of an electronic display corresponding to the scene display, and
  provide the intent indicator as an overlay on the first area of the electronic display over the scene display.

12. The system of claim 9, wherein the object feature is a first ring, and the intent indicator feature is a second ring.

13. The system of claim 9, wherein the object feature is a first ring drawn around a depiction of sensor data corresponding to the object and the intent indicator feature is a second ring drawn around a depiction of intent of one or more computing devices of the vehicle.

14. The system of claim 9, wherein the object feature is an abstract depiction of the object and the intent indicator feature is a ring drawn around a depiction of intent of one or more computing devices of the vehicle.

15. The system of claim 9, wherein the intent indicator further includes a text describing the intent of the vehicle with respect to the external environment of the vehicle.

16. The system of claim 9, wherein the intent indicator is a two-dimensional image.

17. A non-transitory, tangible computer readable medium on which instructions are stored, the instructions when executed by one or more processors cause the one or more processors to perform a method, the method comprising:
  receiving sensor data from one or more sensor systems configured to detect objects in an external environment of a vehicle;
  identifying an object in the vehicle's external environment using the sensor data;
  generating a representation of the object for a scene display depicting the external environment of the vehicle, the representation of the object including an object feature;
  generating an intent indicator for an intent display depicting an intent of the vehicle with respect to the external environment of the vehicle, the intent indicator including an intent indicator feature;
  generating a three-dimensional background scene using map information corresponding to the external environment of the vehicle; and
  providing the representation of the object and intent indicator for display to an occupant of the vehicle in order to indicate to the occupant a relationship between the representation of the object and the intent indicator,
  wherein the three-dimensional background scene is provided as a background for the representation of the object including the object feature,
  wherein the intent indicator with the intent indicator feature is configured to be overlaid onto the three-dimensional background scene,
  wherein, when the intent indicator is overlaid on the three-dimensional background scene, an area within the intent indicator which overlays a portion of the scene display includes a blur effect for the portion in order to distinguish the intent indicator from the scene display.

18. The medium of claim 17, wherein the representation of the object is provided for display in a first area of an electronic display corresponding to the scene display, and the intent indicator is provided for display in a second area of an electronic display distinct from the scene display.

19. The medium of claim 17, wherein the representation of the object is provided for display in a first area of an electronic display corresponding to the scene display, the intent indicator is provided for display as an overlay on the first area of the electronic display over the scene display.

20. The medium of claim 17, wherein the intent indicator further includes a text describing the intent of the vehicle with respect to the external environment of the vehicle.

21. The medium of claim 17, wherein the intent indicator is a two-dimensional image.

* * * * *